(12) United States Patent
Nishimura et al.

(10) Patent No.: US 8,478,485 B2
(45) Date of Patent: Jul. 2, 2013

(54) ELECTRIC POWER STEERING APPARATUS

(75) Inventors: Hiroshi Nishimura, Chiyoda-ku (JP); Chiaki Fujimoto, Chiyoda-ku (JP); Mamoru Shiraki, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 917 days.

(21) Appl. No.: 12/338,695

(22) Filed: Dec. 18, 2008

(65) Prior Publication Data

US 2009/0294208 A1 Dec. 3, 2009

(30) Foreign Application Priority Data

May 29, 2008 (JP) ................................. 2008-141173

(51) Int. Cl.
*B62D 5/04* (2006.01)
(52) U.S. Cl.
USPC ............................................ 701/41; 180/446
(58) Field of Classification Search
USPC ................ 701/41–44; 180/443, 446
See application file for complete search history.

(56) References Cited

U.S. PATENT DOCUMENTS

| | | | | |
|---|---|---|---|---|
| 2004/0031641 | A1* | 2/2004 | McLaughlin | 180/446 |
| 2005/0251311 | A1* | 11/2005 | Burton et al. | 701/41 |
| 2007/0107979 | A1* | 5/2007 | Limpibunterng et al. | 180/446 |
| 2008/0147276 | A1* | 6/2008 | Pattok et al. | 701/42 |
| 2009/0143938 | A1* | 6/2009 | Nishimura | 701/41 |
| 2009/0198417 | A1* | 8/2009 | Limpibunterng et al. | 701/41 |
| 2009/0216407 | A1* | 8/2009 | Cottard et al. | 701/42 |

FOREIGN PATENT DOCUMENTS

| | | |
|---|---|---|
| JP | 07-017423 A | 1/1995 |
| JP | 2891069 B2 | 2/1999 |
| JP | 2001-278090 A | 10/2001 |
| JP | 3285490 B2 | 3/2002 |

* cited by examiner

*Primary Examiner* — Khoi Tran
*Assistant Examiner* — Jason Holloway
(74) *Attorney, Agent, or Firm* — Sughrue Mion, PLLC

(57) ABSTRACT

An electric power steering apparatus is configured in such a way as to include a first filtering unit that applies filtering processing to the detected steering torque signal and outputs the processed torque signal; a control unit that generates and outputs a motor drive signal, based on a steering torque signal outputted from a first filtering unit; a second filtering unit that applies filtering processing to the detected steering torque signal and outputs the processed torque signal; and an interlock unit that generates and outputs a motor drive inhibition signal, based on the steering torque signal outputted from the second filtering unit. The second filtering unit performs filtering processing in such a way as to output a steering torque signal the same as or similar to the steering torque signal that is outputted from the first filtering unit at least when a vehicle is in a predetermined driving condition.

6 Claims, 23 Drawing Sheets

FIG.3
(a)
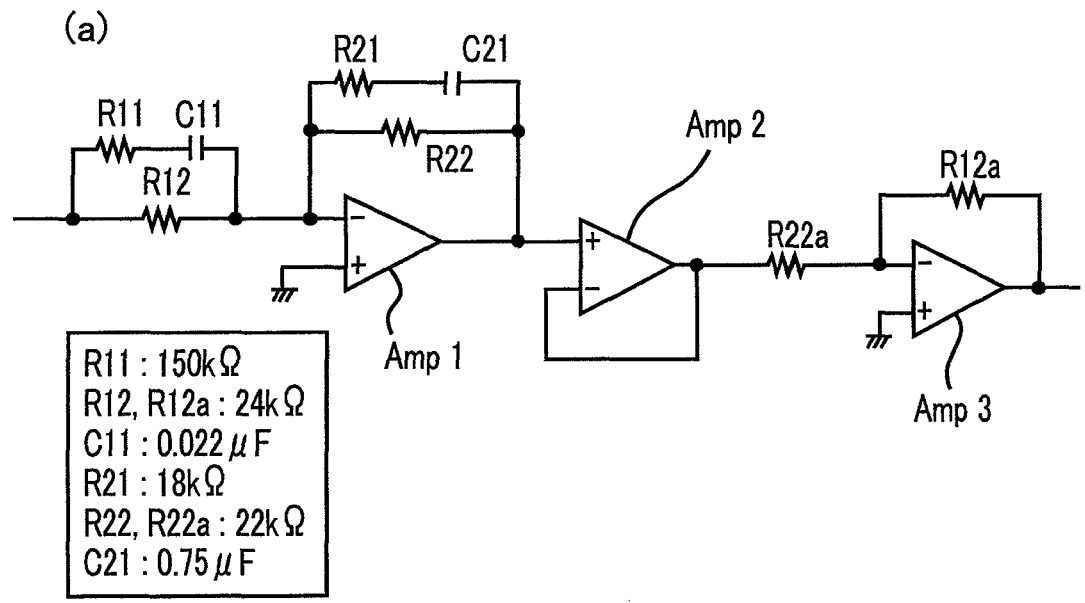
(b)
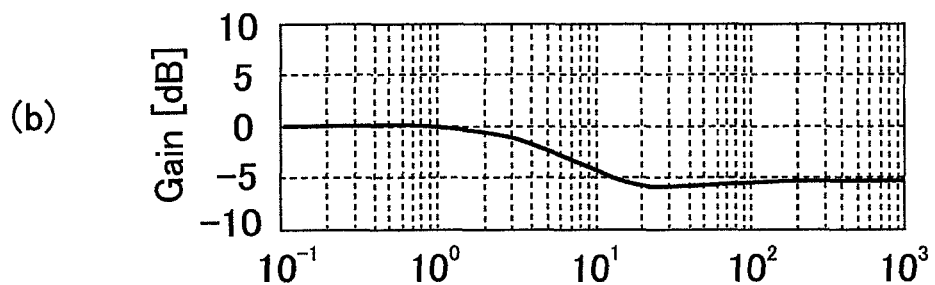
(c)
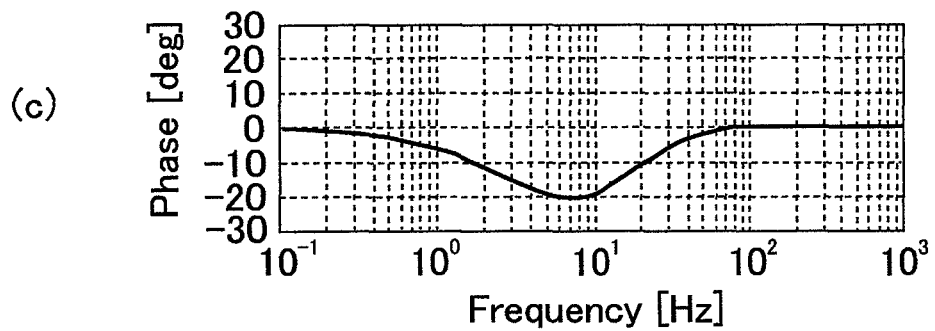
Frequency [Hz]

FIG.5

| MOTOR DRIVE SIGNAL Stmtr | LEFT-DIRECTION-DRIVE INHIBITION SIGNAL Sinhl | RIGHT-DIRECTION-DRIVE INHIBITION SIGNAL Sinhr | MOTOR DRIVE SIGNAL Sdmtr |
|---|---|---|---|
| RIGHT-DIRECTION DRIVE | PERMITTED | PERMITTED | RIGHT-DIRECTION DRIVE |
| RIGHT-DIRECTION DRIVE | PERMITTED | INHIBITED | DRIVE INTERRUPTED |
| RIGHT-DIRECTION DRIVE | INHIBITED | PERMITTED | RIGHT-DIRECTION DRIVE |
| RIGHT-DIRECTION DRIVE | INHIBITED | INHIBITED | DRIVE INTERRUPTED |
| LEFT-DIRECTION DRIVE | PERMITTED | PERMITTED | LEFT-DIRECTION DRIVE |
| LEFT-DIRECTION DRIVE | PERMITTED | INHIBITED | LEFT-DIRECTION DRIVE |
| LEFT-DIRECTION DRIVE | INHIBITED | PERMITTED | DRIVE INTERRUPTED |
| LEFT-DIRECTION DRIVE | INHIBITED | INHIBITED | DRIVE INTERRUPTED |

FIG.6
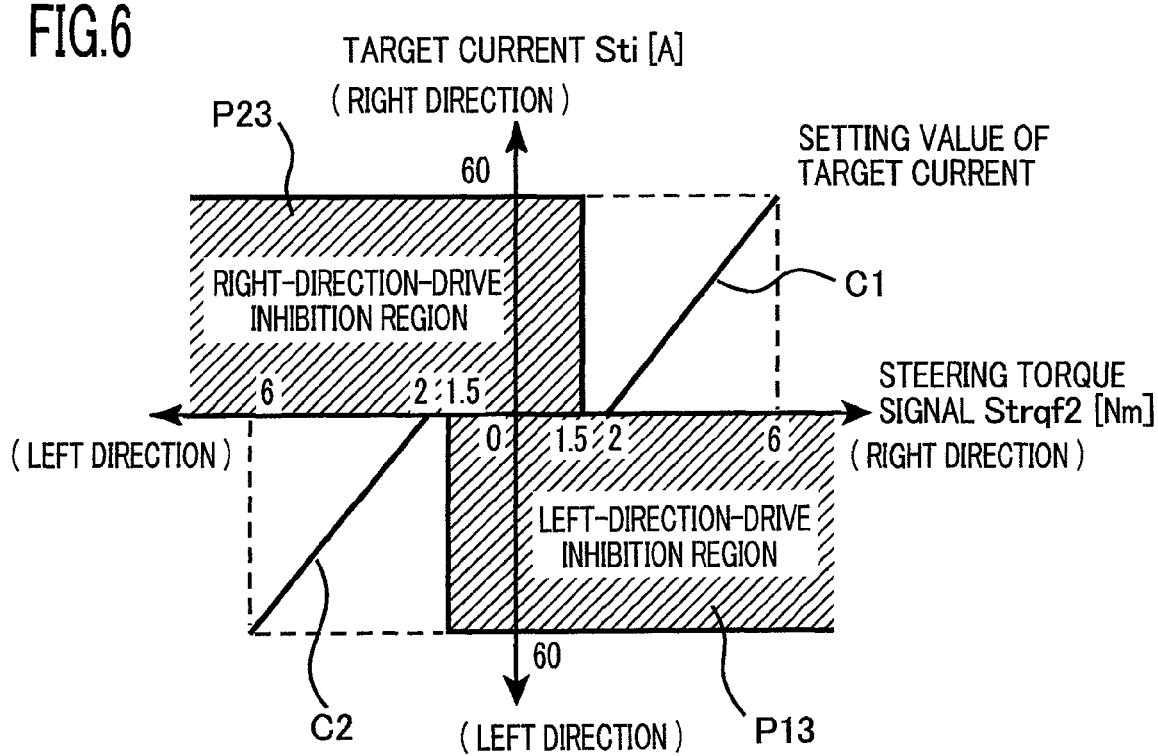
FIG.7 IN THE CASE WHERE FILTERING PROCESSING BY SECOND FILTERING UNIT IS NOT PERFORMED
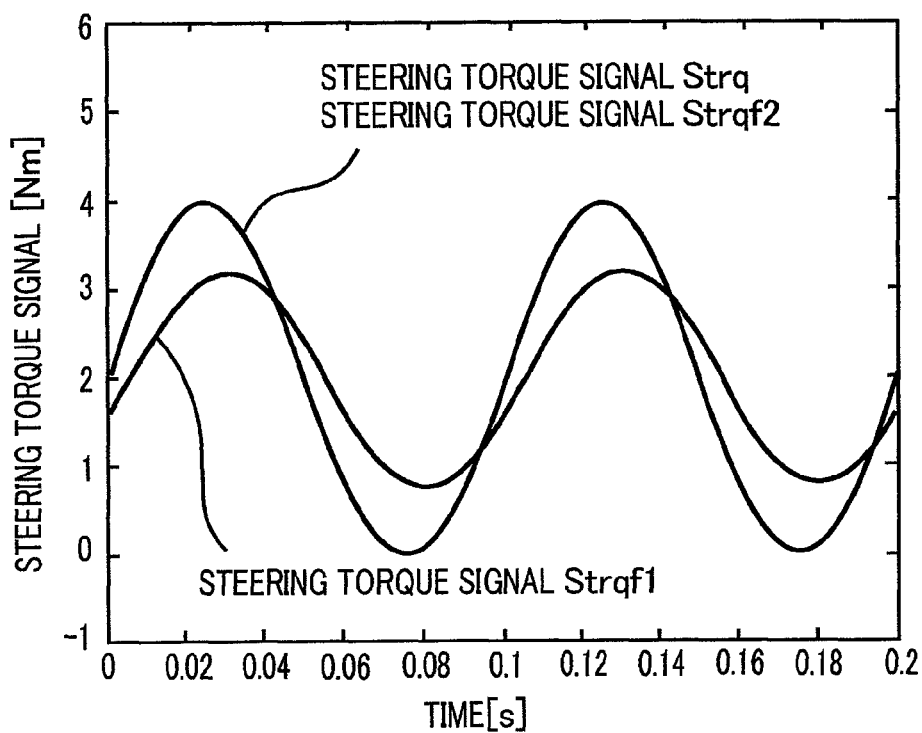

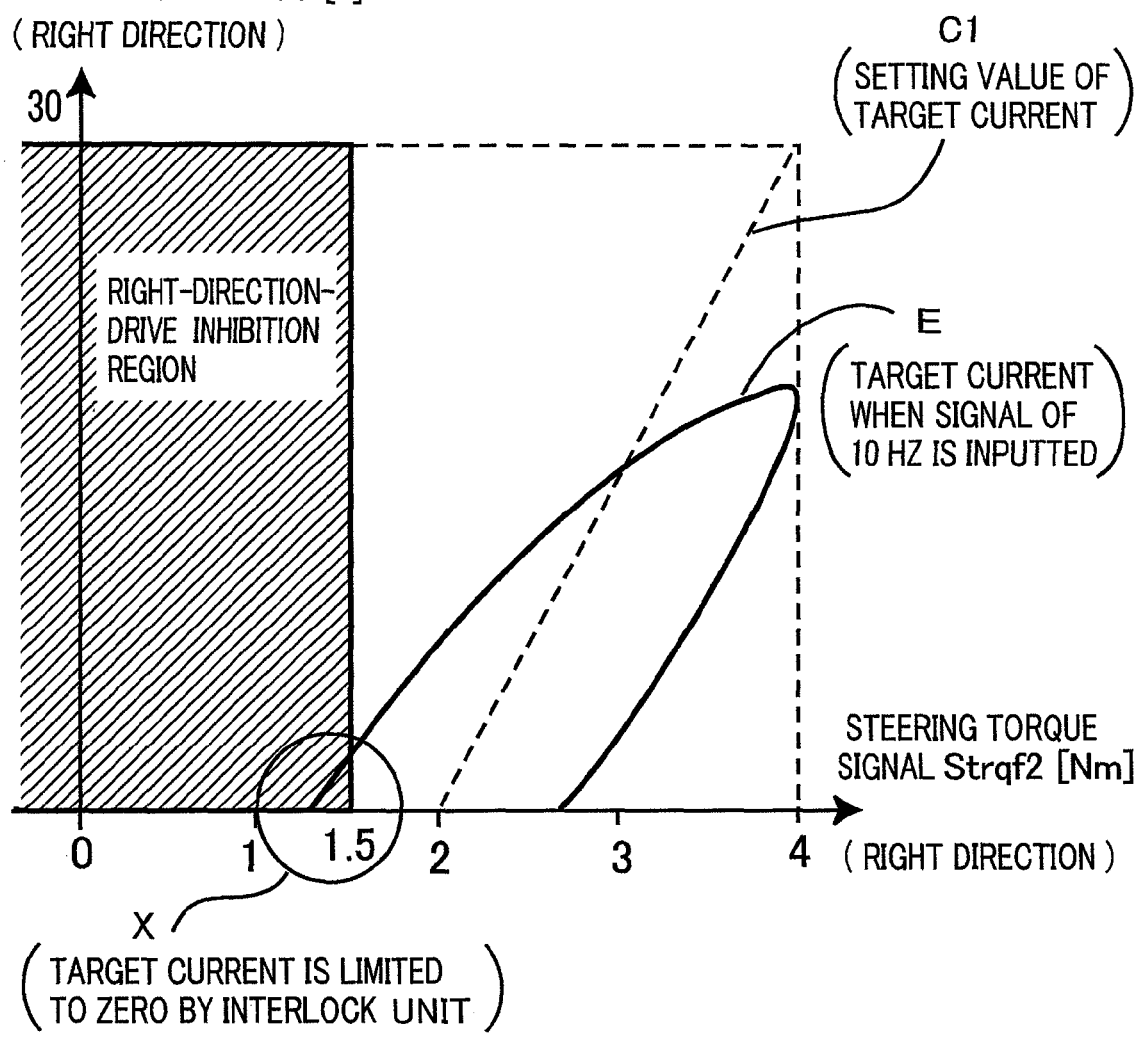

FIG.10  IN THE CASE WHERE FILTERING PROCESSING BY SECOND FILTERING UNIT IS PERFORMED
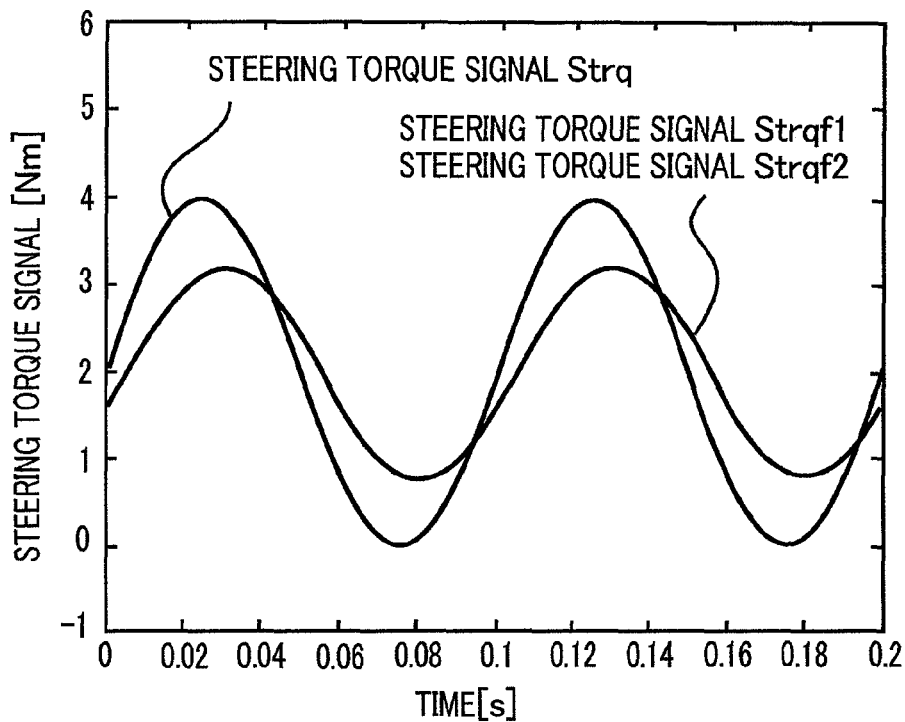
FIG.11
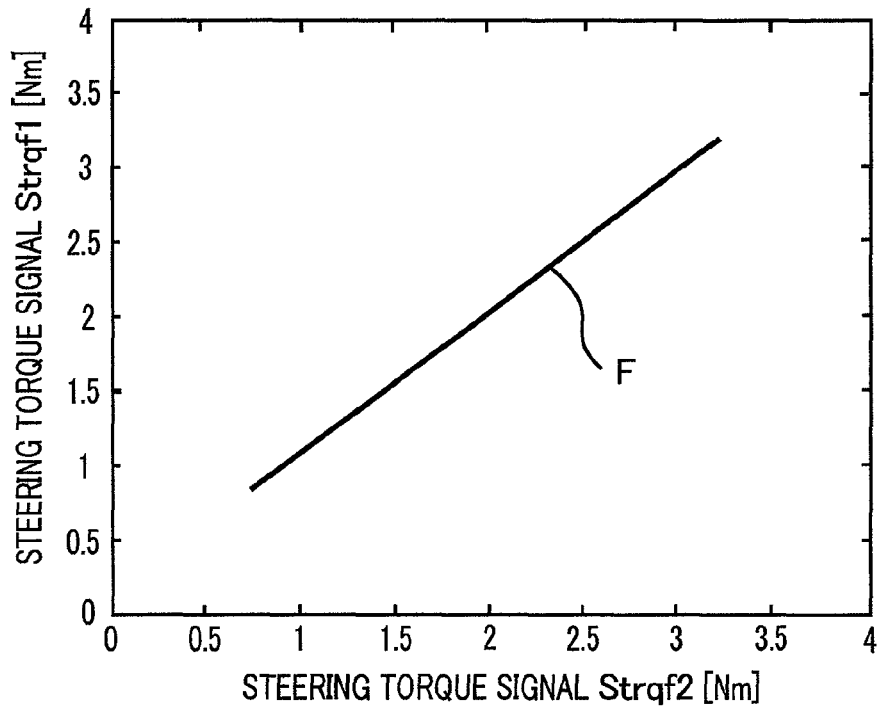

FIG.14
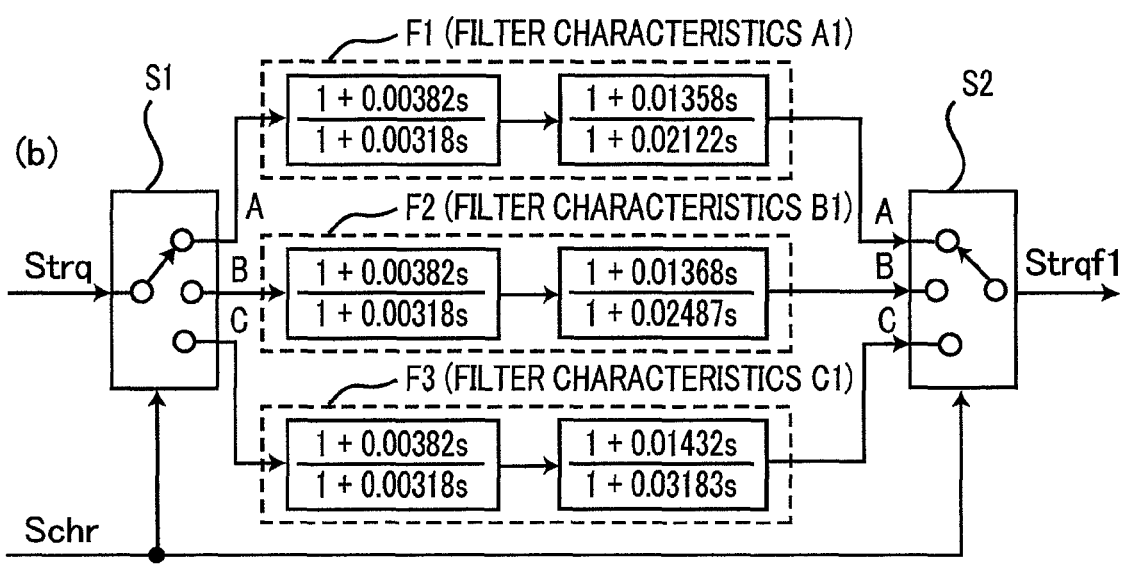
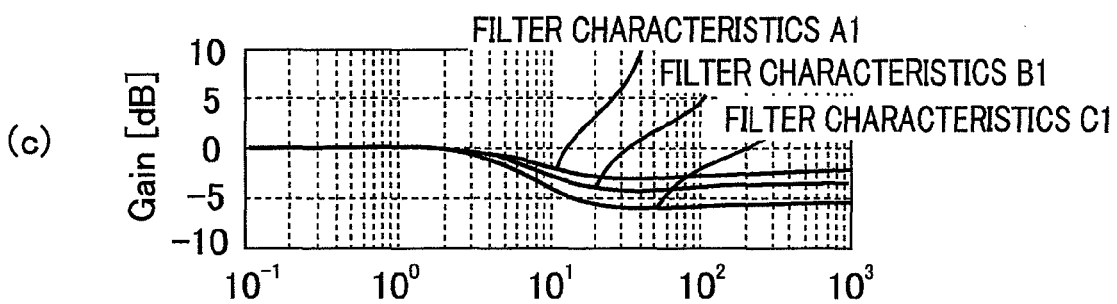
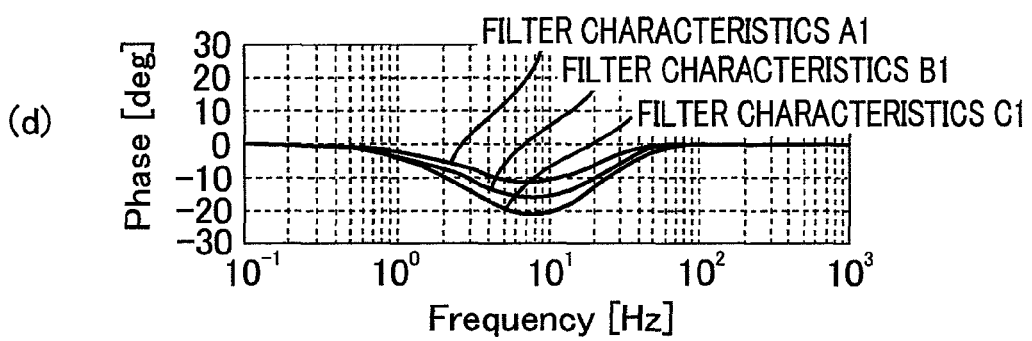

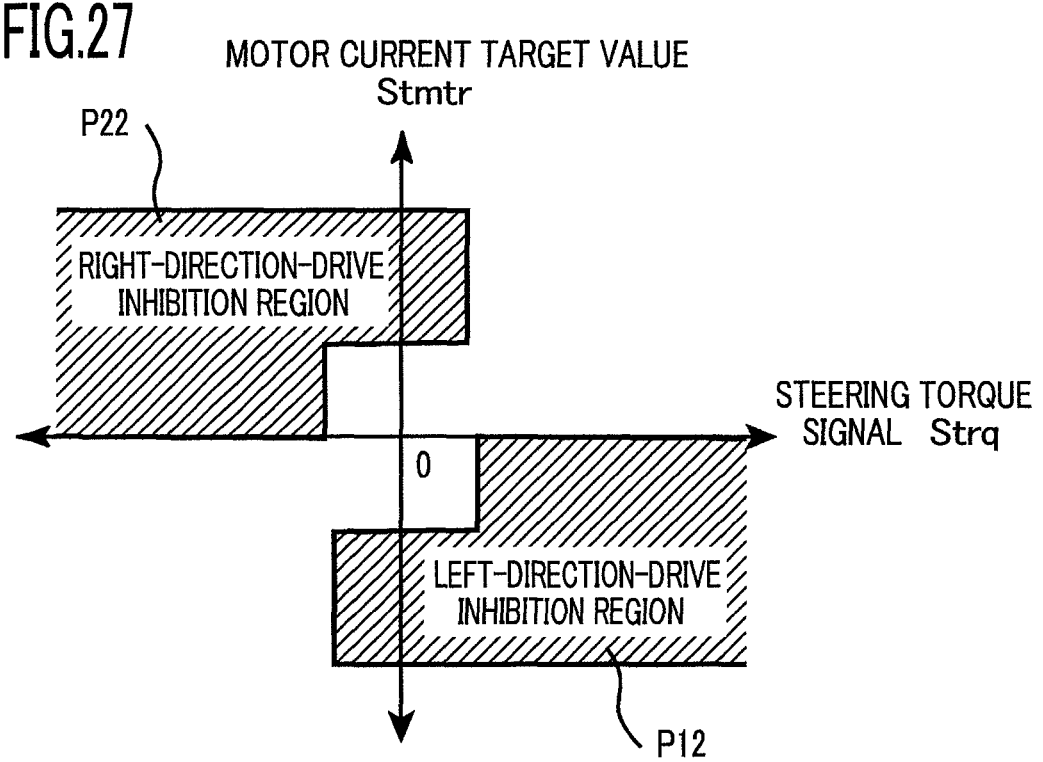

ELECTRIC POWER STEERING APPARATUS

BACKGROUND OF THE INVENTION

1. Field of the Invention

The present invention relates to an electric power steering apparatus that drives a motor so as to reduce steering torque, on a steering wheel, that is exerted by a driver.

2. Description of the Related Art

To date, as a unit for ensuring the safety in the case where a microcomputer of an electric power steering apparatus fails, there has been proposed an interlock unit that determines whether or not the direction of steering torque and the direction of motor driving coincide with each other, and inhibits the motor from being driven in the case where the direction of steering torque and the direction of motor driving do not coincide with each other (e.g., refer to Japanese Patent No. 2891069).

In such a conventional apparatus as described above, steering torque produced by the steering of a driver is detected; a target motor current is calculated based on a steering torque signal corresponding to the detected steering torque; and a motor is driven based on the target motor current so that the steering torque exerted by the driver is reduced. Meanwhile, in the interlock unit, a drive inhibition region is calculated for the steering torque signal; in the case where the steering torque signal indicates the right direction or the neutral direction, a left-direction drive is inhibited, and in the case where the steering torque signal indicates the left direction or the neutral direction, a right-direction drive is inhibited; thus, the motor is driven in such a way as to reduce steering torque exerted by the driver, but the motor is inhibited from being driven in such a way as to increase steering torque exerted by the driver.

However, in the foregoing conventional apparatus, in some cases, the steering torque signal utilized for calculating the target motor current and the steering torque signal utilized in the interlock unit differ from each other; therefore, in the case where the steering torque signal fluctuates in a short cycle period, the interlock unit determines that the target motor current is within the drive inhibition region, even though the target motor current is correctly calculated, and thereby the drive of the motor is interrupted. As a result, there has been a problem that the stability of the steering system cannot be ensured and setting of desired steering feeling cannot be implemented.

Additionally, there has been a problem that, in the case where the setting range for the target motor current is limited in such a way that the difference between the steering torque signal utilized for calculating the target motor current and the steering torque signal utilized in the interlock unit is smaller than a predetermined value, setting of desired steering feeling cannot be performed.

SUMMARY OF THE INVENTION

The present invention has been implemented in order to solve the foregoing problems in the conventional apparatuses; the objective thereof is to provide an electric power steering apparatus capable of ensuring the stability of a steering system and capable of setting of desired steering feeling.

An electric power steering apparatus according to the present invention is configured in such a way as to, by use of driving force of a motor, reduce steering torque, on a steering system, that is exerted by a driver of a vehicle via a steering wheel; the electric power steering apparatus includes a steering torque detector that detects the steering torque and outputs a steering torque signal corresponding to the steering torque; a first filtering unit that applies filtering processing to the steering torque signal outputted from the steering torque detector and outputs the steering torque signal obtained through the filtering processing; a control unit that receives the steering torque signal outputted from the first filtering unit and outputs a motor drive signal based on the inputted steering torque signal; a second filtering unit that applies filtering processing to the steering torque signal outputted from the steering torque detector and outputs the steering torque signal obtained through the filtering processing; an interlock unit that receives the steering torque signal outputted from the second filtering unit and outputs a motor drive inhibition signal, for limiting drive of the motor, based on the inputted steering torque signal; and a motor drive unit that drives the motor, based on the motor drive signal outputted from the control unit and the motor drive inhibition signal outputted from the interlock unit. The second filtering unit performs the filtering processing in such a way as to reduce the difference between the steering torque signal that is inputted from the first filtering unit to the control unit and the steering torque signal that is inputted from the second filtering unit to the interlock unit.

The electric power steering apparatus according to the present invention preferably includes a first filter characteristic adjustment unit that dynamically changes the filter characteristic of the first filtering unit, based on a condition of the vehicle or the driver.

Moreover, the electric power steering apparatus according to the present invention is configured preferably in such a way that the first filter characteristic adjustment unit changes the filter characteristic of the second filtering unit as well as the filter characteristic of the first filtering unit.

Still moreover, the electric power steering apparatus according to the present invention preferably includes a second filter characteristic adjustment unit that dynamically changes the filter characteristic of the second filtering unit, based on a condition of the vehicle or the driver.

Furthermore, the electric power steering apparatus according to the present invention is configured preferably in such a way that the first filtering unit is included in a first microcomputer mounted on the vehicle, and the second filtering unit is formed of an analogue circuit.

Still furthermore, the electric power steering apparatus according to the present invention is configured preferably in such a way that the first filtering unit is included in a first microcomputer mounted on the vehicle, and the second filtering unit is included in a second microcomputer mounted on the vehicle.

In the electric power steering apparatus according to the present invention, the second filtering unit performs the filtering processing in such a way as to reduce the difference between the steering torque signal that is inputted from the first filtering unit to the control unit and the steering torque signal that is inputted from the second filtering unit to the interlock unit; therefore, the stability of the steering system can be ensured, and setting of desired steering feeling can be implemented.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 3 includes an explanatory diagram and explanatory graphs representing the configuration of a second filtering unit in an electric power steering apparatus according to Embodiment 1 of the present invention;

FIG. 5 is a table representing the relationship among a motor drive signal, a right-direction-drive inhibition signal, a left-direction-drive inhibition signal, and a motor drive control signal in an electric power steering apparatus according to Embodiment 1 of the present invention;

FIG. 6 is an explanatory chart representing a target current and a drive inhibition region in an electric power steering apparatus according to Embodiment 1 of the present invention;

FIG. 7 is a waveform graph representing a steering torque signal in the case where filtering processing by a second filtering unit is not performed;

FIG. 9 is an explanatory graph representing a drive inhibition region set by an interlock unit based on a target current and a steering torque signal to which filtering processing has not been applied by a second filtering unit;

FIG. 10 is a waveform graph representing a steering torque signal in an electric power steering apparatus according to Embodiment 1 of the present invention;

FIG. 11 is a graph representing a steering torque signal in an electric power steering apparatus according to Embodiment 1 of the present invention;

FIG. 14 includes an explanatory table, an explanatory diagram, and explanatory graphs representing the configuration of a first filtering unit in an electric power steering apparatus according to Embodiment 2 of the present invention;

FIG. 27 is an explanatory chart illustrating drive inhibition regions in an electric power steering apparatus according to further another technology that is a basis of the present invention.

DETAILED DESCRIPTION OF THE PREFERRED EMBODIMENTS

Figure 22:
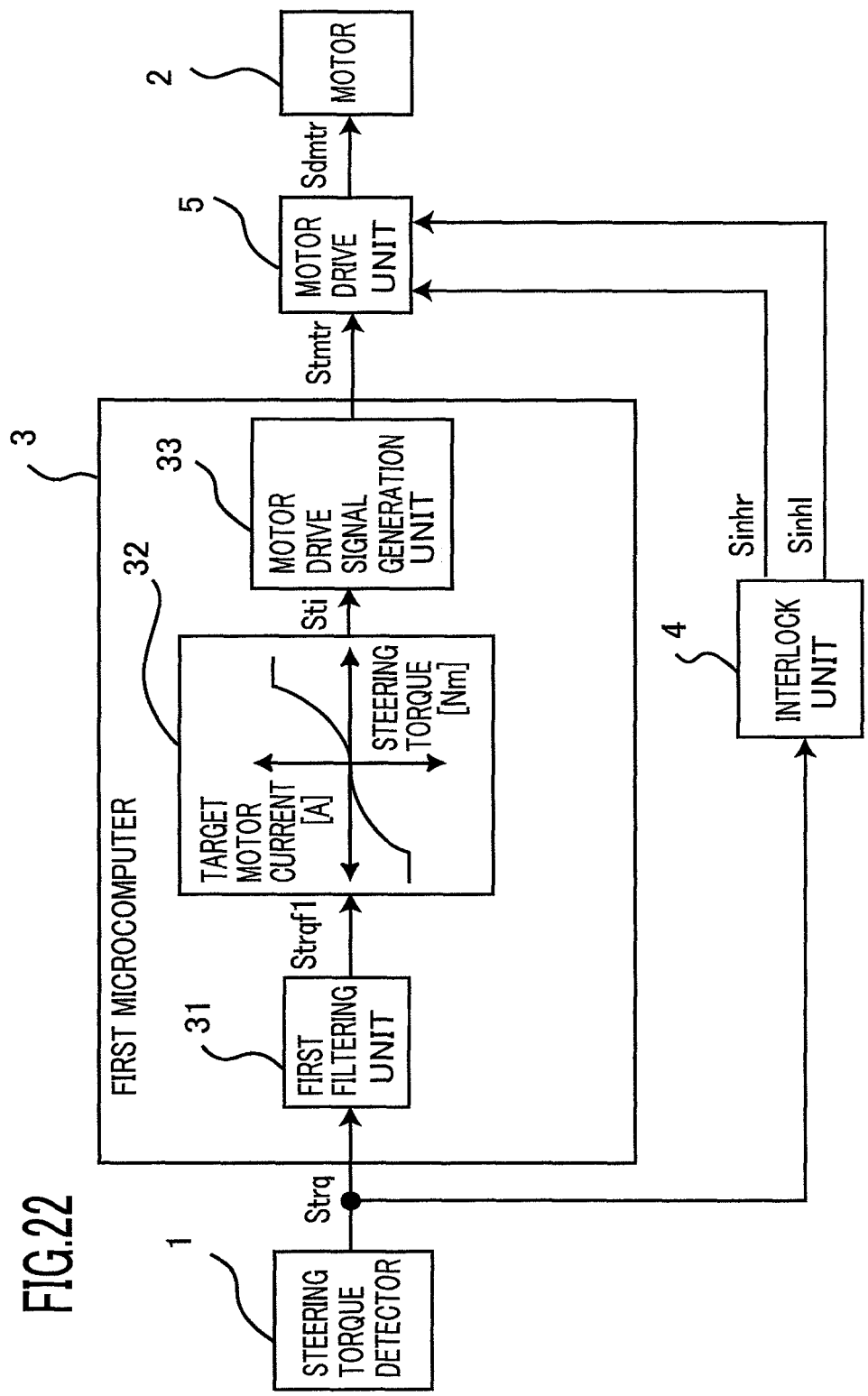
FIG. 22 is a block diagram illustrating the configuration of an electric power steering apparatus according to a technology that is a basis of the present invention.

In the first place, an explanation will be made for an electric power steering apparatus according to a technology that is a basis of the present invention. FIG. 22 is a block diagram illustrating the configuration of an electric power steering apparatus based on a technology that is a basis of the present invention. In FIG. 22, a steering torque detector 1 detects steering torque on a steering system exerted by a vehicle driver via a steering wheel and outputs a steering torque signal Strq corresponding to the detected steering torque.

A motor 2 exerts on the steering system driving force that reduces the steering torque exerted by the driver. A first microcomputer 3 generates a motor drive signal Stmtr in accordance with the steering torque signal Strq from the steering torque detector 1 and inputs the motor drive signal Stmtr to a motor drive unit 5. The motor drive unit 5 outputs a motor drive control signal Sdmtr, based on a right-direction-drive inhibition signal Sinhr and a left-direction-drive inhibition signal Sinhl that are outputted from an interlock unit 4 described later and that serve as motor drive inhibition signals and the motor drive signal Stmtr, so as to control the motor 2.

A first filtering unit 31 applies filtering processing to the steering torque signal Strq outputted from the steering torque detector 1 and outputs an output signal Strqf1. A target current calculation unit 32 calculates a target motor current Sti, based on the output signal Strqf1 of the first filtering unit 31. A motor drive signal generation unit 33 generates and outputs a motor drive signal Stmtr for driving the motor 2, based on the target motor current Sti outputted from the target current calculation unit 32. The first filtering unit 31, the target current calculation unit 32, and the motor drive signal generation unit 33 are included in the first microcomputer 3.

An interlock unit 4 determines, in accordance with the output of the steering torque detector 1, whether drive of the motor 2 is permitted or inhibited and outputs a motor drive inhibition signal described later. The target current calculation unit 32 and the motor drive signal generation unit 33 configure a control unit of the electric power steering apparatus.

In the electric power steering apparatus, based on a technology that is a basis of the present invention, which is configured as described above, when the driver operates the steering wheel (unillustrated), the steering torque detector 1 detects steering torque exerted by the driver and outputs the steering torque signal Strq corresponding to the detected steering torque. The steering torque signal Strq outputted from the steering torque detector 1 is inputted to the first microcomputer 3 and the interlock unit 4.

Figure 2:
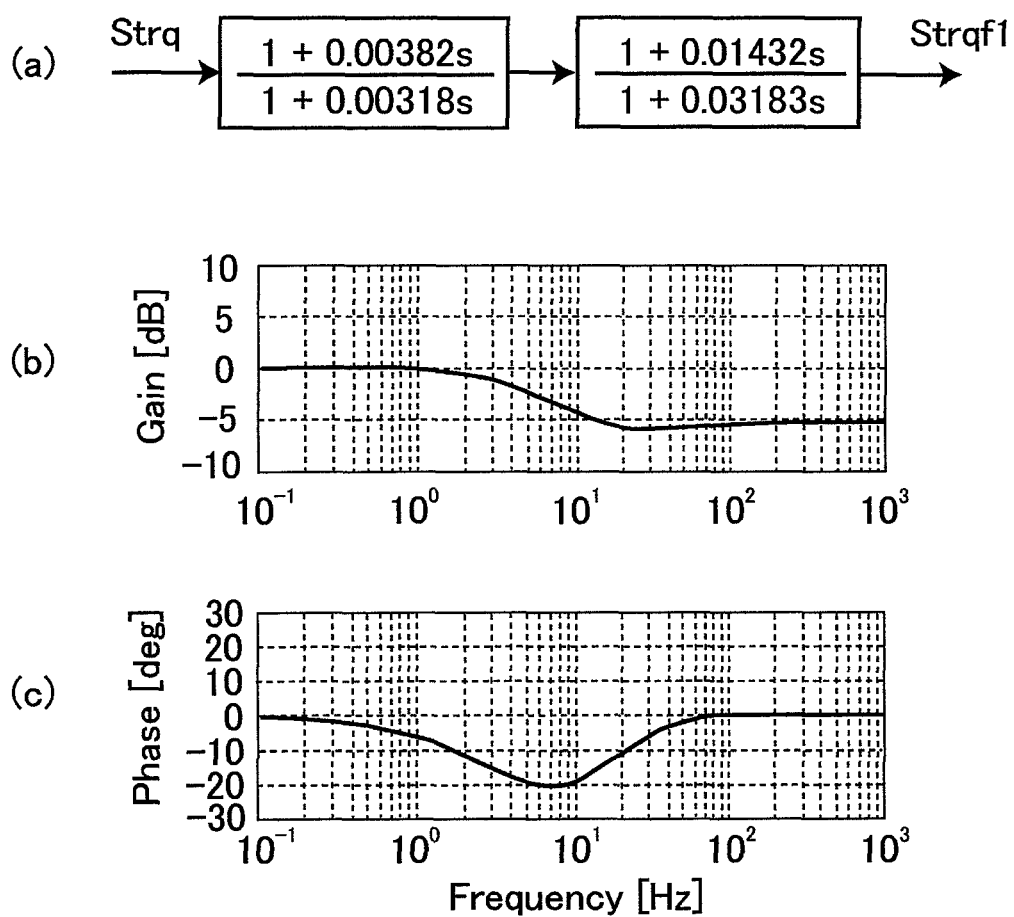
FIG. 2 is a set of charts representing the transfer function of a first filtering unit in an electric power steering apparatus according to Embodiment 1 of the present invention.

The first filtering unit 31 applies filtering processing to the steering torque signal Strq and outputs the processed steering torque signal as the steering torque signal Strqf1. In addition, the first filtering unit 31 is utilized for ensuring the stability of the steering system (for suppressing a vibration) and enhancing steering feeling. Additionally, the transfer function, as the filter characteristic, of the first filtering unit 31 has frequency characteristic, for example, as represented in FIG. 2 described later.

The target current calculation unit 32 calculates the target motor current Sti by use of the steering torque signal Strqf1. In addition, as an input of the target current calculation unit 32, a vehicle traveling speed, a steering speed, or the like may be utilized. The motor drive signal generation unit 33 converts the target motor current Sti into the motor drive signal Stmtr and outputs the motor drive signal Stmtr. In order to realize the motor drive signal Stmtr, for example, a PWM (pulse-width modulation) method or a serial communication method is utilized.

Figure 23:
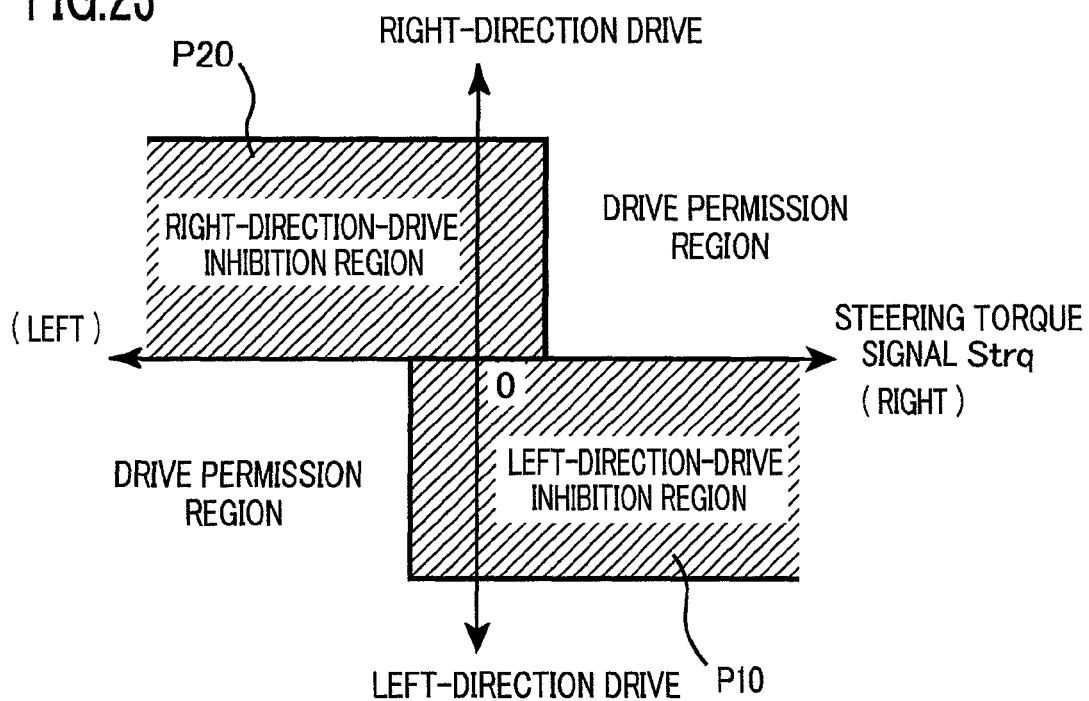
FIG. 23 is an explanatory chart illustrating a drive inhibition region in an electric power steering apparatus according to a technology that is a basis of the present invention.

The interlock unit 4 sets a drive inhibition region in accordance with the steering torque signal Strq. FIG. 23 is an explanatory chart representing examples of drive inhibition regions set by the interlock unit 4. In FIG. 23, the abscissa denotes the steering torque signal Strq, and the ordinate denotes the driving direction. As represented in FIG. 23, in the case where the steering torque signal Strq indicates the right direction or the approximately neutral direction (the steering torque signal Strq is close to "0", and the same applies hereinafter), it is determined, as represented by the region P10 hatched by the slanted lines, that left-direction drive in a predetermined area is inhibited; in the case where the steering torque signal Strq indicates the left direction or the approximately neutral direction, it is determined, as represented by the region P20 hatched by the slanted lines, that right-direction drive in a predetermined area is inhibited. When determining that the steering torque signal Strq corresponds to the right-direction-drive inhibition region P20, the interlock unit 4 outputs a right-direction-drive inhibition signal Sinhr as the motor drive inhibition signal; when determining that the steering torque signal Strq corresponds to the left-direction-drive inhibition region P10, the interlock unit 4 outputs a left-direction-drive inhibition signal Sinhl as the motor drive inhibition signal.

The motor drive unit 5 calculates the motor drive control signal Sdmtr, based on the right-direction-drive inhibition signal Sinhr and the left-direction-drive inhibition signal Sinhl that are outputted from the interlock unit 4 and the motor drive signal Stmtr that is outputted by the first microcomputer 3, and outputs the motor drive control signal Sdmtr so as to perform control on driving the motor 2 or on interrupting the drive of the motor 2. FIG. 5 is a table representing the relationship among the motor drive signal Stmtr, the right-direction-drive inhibition signal Sinhr, the left-direction-drive inhibition signal Sinhl, and the motor drive control signal Sdmtr; in accordance with the driving direction indicated by the motor drive signal Stmtr, "permission" or "inhibition" indicated by the left-direction-drive inhibition signal Sinhl, and "permission" or "inhibition" indicated by the right-direction-drive inhibition signal Sinhr, the contents of the control, on the driving direction or on the drive interruption, that is applied to the motor 2 by unit of the motor drive control signal Sdmtr are determined.

For example, in the case where the motor drive signal Stmtr indicates "right-direction drive", the left-direction-drive inhibition signal Sinhl indicates "permission", and the right-direction-drive inhibition signal Sinhr indicates "inhibition", the motor drive control signal Sdmtr indicates "drive interruption". In other words, in this case, the drive region corresponds to the region P20 represented in FIG. 23. In addition, the motor drive unit 5 may be configured in such a way as to maintain the interruption of the motor drive after the motor drive control signal Sdmtr once indicates "drive interruption".

As described above, there is realized an electric power steering apparatus in which the motor 2 is driven in such a way as to reduce steering torque exerted by the driver, but the motor 2 is inhibited from being driven in such a way as to increase steering torque exerted by the driver.

Figure 24:
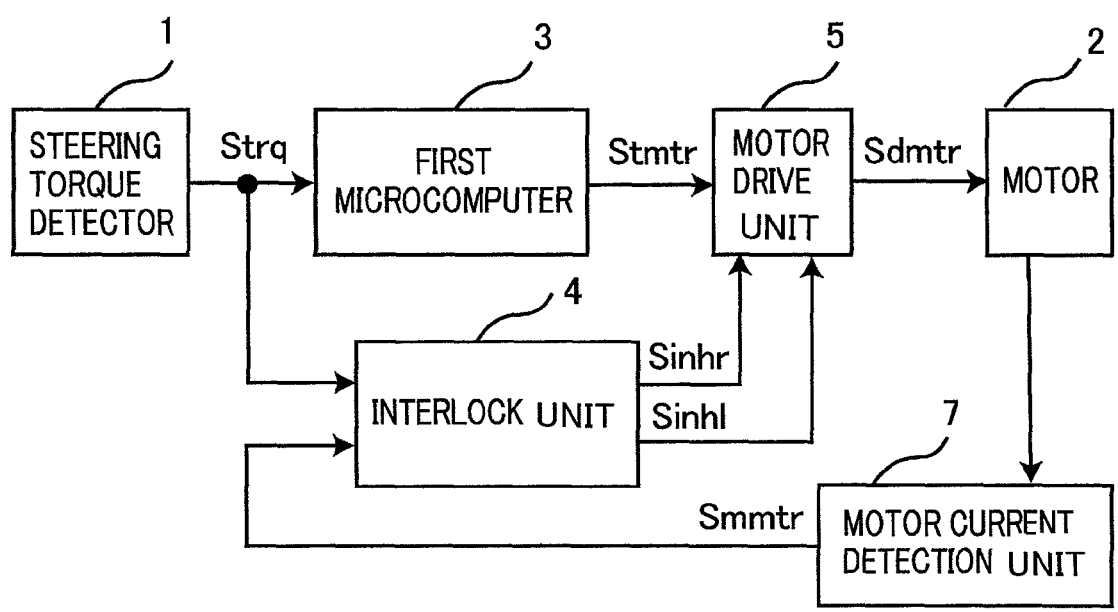
FIG. 24 is a block diagram illustrating the configuration of an electric power steering apparatus according to another technology that is a basis of the present invention.

In some cases, as disclosed in Japanese Patent Publication No. 2891069, the electric power steering apparatus is configured in such a way that the drive inhibition region to be set by the interlock unit 4 changes based on a motor current detection value. FIG. 24 is a block diagram illustrating an electric power steering apparatus based on a technology that is a basis of the present invention, in the case where the drive inhibition region to be set by the interlock unit 4 changes based on the motor current detection value. In FIG. 24, a motor current detection unit 7 detects a motor current that flows in the motor 2 and outputs a motor current detection value Smmtr. The interlock unit 4 receives the steering torque signal Strq and the motor current detection value Smmtr and outputs the right-direction-drive inhibition signal Sinhr and the left-direction-drive inhibition signal Sinhl that each serve as the motor drive inhibition signal.

Figure 25:
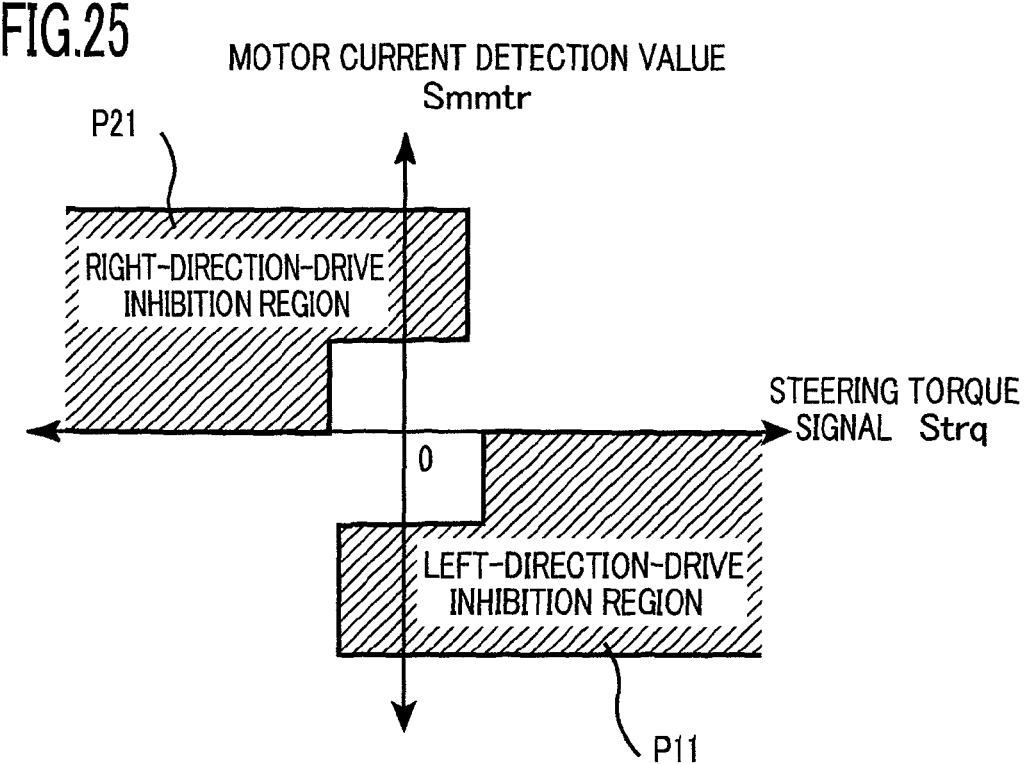
FIG. 25 is an explanatory chart illustrating drive inhibition regions in an electric power steering apparatus according to another technology that is a basis of the present invention.

FIG. 25 is an explanatory chart representing examples of drive inhibition regions set by the interlock unit 4 illustrated in FIG. 24. In FIG. 25, the abscissa denotes the steering torque signal Strq, and the ordinate denotes the motor current detection value Smmtr. As represented in FIG. 25, in the case where the motor current detection value Smmtr is within a predetermined range close to "0", respective parts of the left-direction-drive inhibition region P10 and the right-direction-drive inhibition region P20, represented in FIG. 23, are changed into drive permission regions; as a result, a left-direction-drive inhibition region P11 and a right-direction-drive inhibition region P21 hatched by the slanted lines are set.

Figure 26:
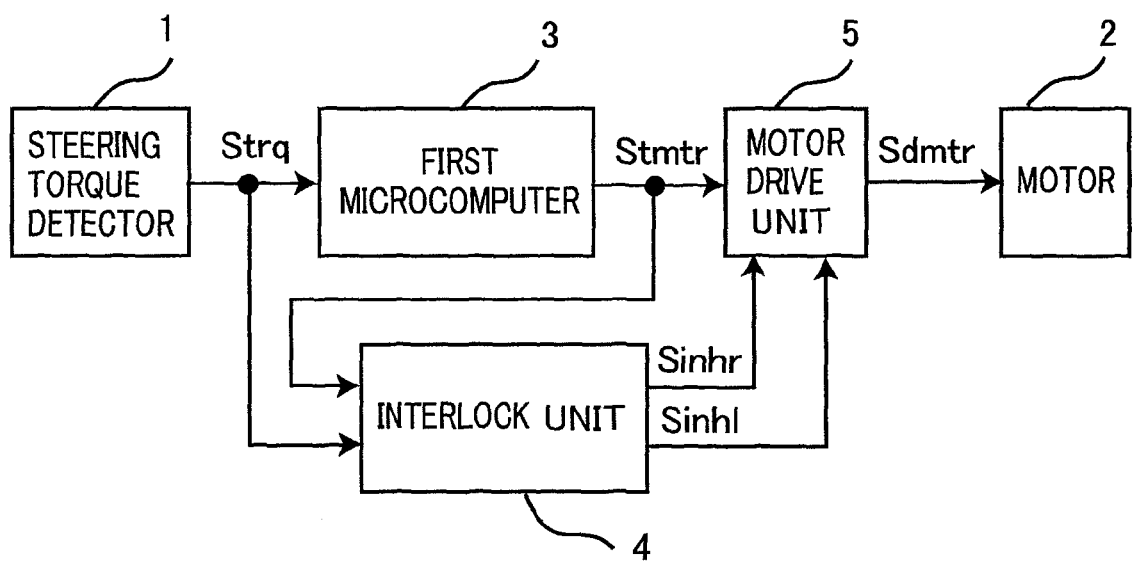
FIG. 26 is a block diagram illustrating the configuration of an electric power steering apparatus according to further another technology that is a basis of the present invention.

In some cases, the electric power steering apparatus is configured in such a way that the drive inhibition region to be set by the interlock unit 4 is changed by a target motor current value. FIG. 26 is a block diagram illustrating an electric power steering apparatus based on a technology that is a basis of the present invention, in the case where the drive inhibition region to be set by the interlock unit 4 is changed by the target motor current value. IN FIG. 26, the interlock unit 4 receives the steering torque signal Strq and the target motor current value Stmtr outputted by the first microcomputer 3 and outputs the right-direction-drive inhibition signal Sinhr and the left-direction-drive inhibition signal Sinhl that each serve as the motor drive inhibition signal.

FIG. 27 is an explanatory chart representing examples of drive inhibition regions set by the interlock unit 4 illustrated in FIG. 26. In FIG. 27, the abscissa denotes the steering torque signal Strq, and the ordinate denotes the target motor current value Stmtr. As represented in FIG. 27, in the case where the target motor current value Stmtr is within a predetermined range close to "0", respective parts of the left-direction-drive inhibition region P10 and the right-direction-drive inhibition region P20, represented in FIG. 23, are changed into drive permission regions; as a result, a left-direction-drive inhibition region P12 and a right-direction-drive inhibition region P22 hatched by the slanted lines are set.

In the case of an electric power steering apparatus based on a technology that is a basis of the present invention, the steering torque signal utilized for calculating a target motor current and the steering torque signal utilized in the interlock unit may differ from each other; therefore, there has been a problem that, in the case where the steering torque signal fluctuates in a short cycle period, the target motor current may fall into the drive inhibition region set by the interlock unit, even though the target motor current is correctly calculated, and thereby the drive of the motor is interrupted.

The present invention is to solve the foregoing problems in the technology that is a basis of the present invention and the conventional apparatus; an electric power steering apparatus according to Embodiment 1 of the present invention will be explained in detail below.

Embodiment 1

Figure 1:
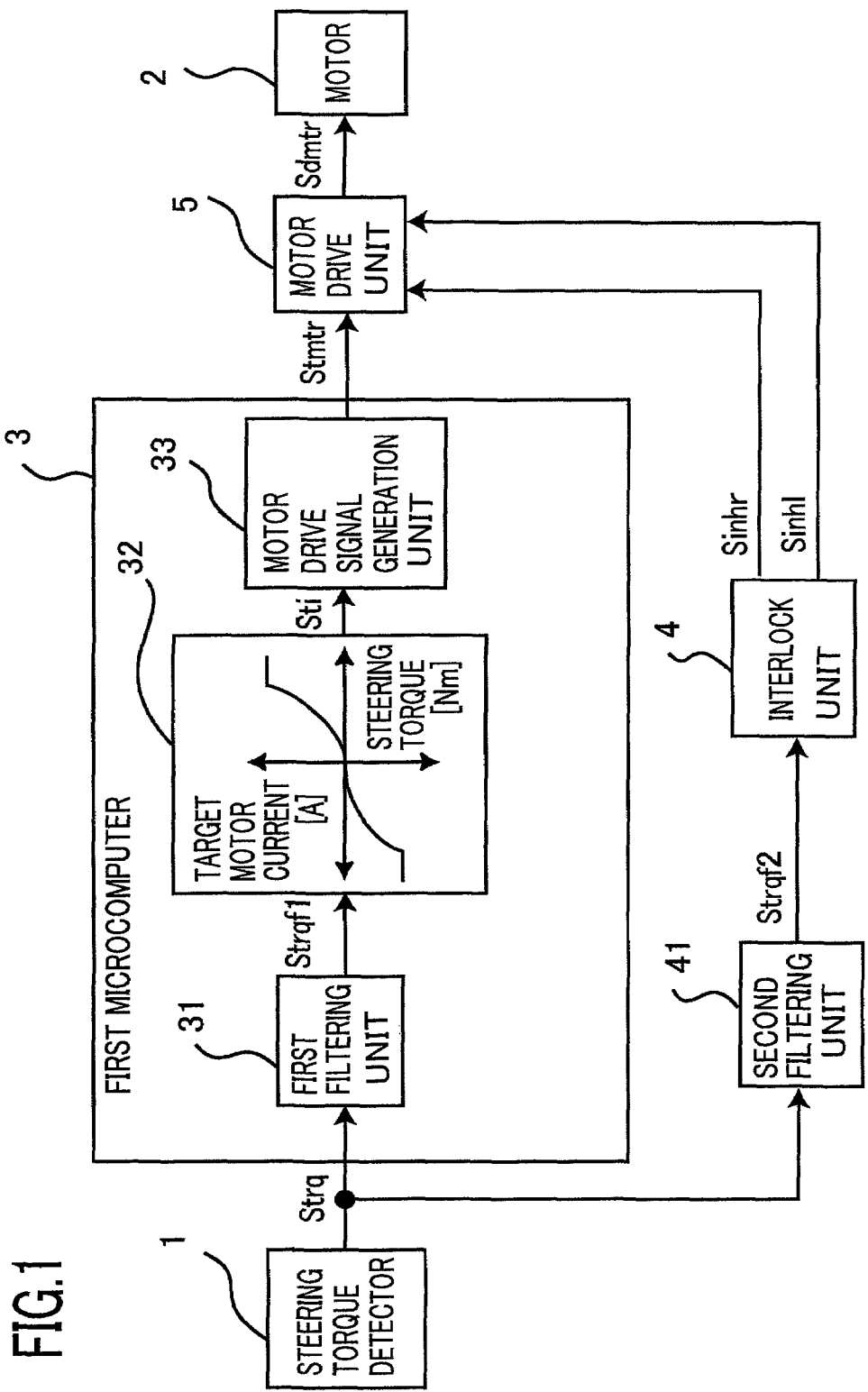
FIG. 1 is a block diagram illustrating the configuration of an electric power steering apparatus according to Embodiment 1 of the present invention.

FIG. 1 is a block diagram of an electric power steering apparatus according to Embodiment 1 of the present invention. In FIG. 1, a steering torque detector 1 detects steering torque on a steering system exerted by a vehicle driver via a steering wheel and outputs a steering torque signal Strq corresponding to the detected steering torque. A motor 2 generates driving power that reduces the steering torque exerted by the driver. A first microcomputer 3 generates a motor drive signal Stmtr in accordance with the steering torque signal Strq outputted from the steering torque detector 1 and inputs the motor drive signal Stmtr to a motor drive unit 5. The motor drive unit 5 outputs a motor drive control signal Sdmtr, based on a right-direction-drive inhibition signal Sinhr and a left-direction-drive inhibition signal Sinhl that are outputted from an interlock unit 4 described later and that serve as motor drive inhibition signals and the motor drive signal Stmtr, so as to control the motor 2.

A first filtering unit 31 applies filtering processing to the steering torque signal Strq outputted from the steering torque detector 1 and outputs a steering torque signal Strqf1 obtained through the filtering processing. A target current calculation unit 32 calculates and outputs a target motor current Sti, based on the steering torque signal Strqf1 outputted from the first filtering unit 31. A motor drive signal generation unit 33 converts the target motor current Sti outputted from the target current calculation unit 32 into the motor drive signal Stmtr for driving the motor 2 and outputs the motor drive signal Stmtr. The first filtering unit 31, the target current calculation unit 32, and the motor drive signal generation unit 33 are included in the first microcomputer 3.

A second filtering unit 41 is formed of an analogue circuit outside the first microcomputer 3 and has filter characteristic similar to that of the first filtering unit 31. The second filtering unit 41 applies filtering processing to the steering torque signal Strq outputted from the steering torque detector 1 and outputs a steering torque signal Strqf2 obtained through the filtering processing. The interlock unit 4 determines, in accordance with the steering torque signal Strqf2 outputted from the second filtering unit 41, whether drive of the motor 2 is permitted or inhibited and outputs the motor drive inhibition signal. The target current calculation unit 32 and the motor drive signal generation unit 33 configure a control unit of the electric power steering apparatus.

Next, the operation of the electric power steering apparatus, according to Embodiment 1 of the present invention, which is configured as described above will be explained. In FIG. 1, when the driver operates the steering wheel (unillustrated), the steering torque detector 1 detects steering torque exerted by the driver and outputs the steering torque signal Strq corresponding to the detected steering torque. The steering torque signal Strq is inputted to the first filtering unit 31 included in the first microcomputer 3 and the second filtering unit 41 formed outside the first microcomputer 3.

The first filtering unit 31 applies filtering processing to the steering torque signal Strq and outputs the steering torque signal Strqf1. FIG. 2 is a set of diagrams representing the transfer function as the filter characteristic of the first filtering unit 31; FIG. 2($a$) represent the configuration of the first filtering unit 31, FIG. 2($b$) represent the gain vs. frequency characteristic of the first filtering unit 31, and FIG. 2($c$) represent the phase vs. frequency characteristic of the first filtering unit 31. The first filtering unit 31 applies filtering processing and phase compensation to the steering torque signal Strq, based on the filter characteristic thereof, so that the stability of the steering system can be ensured and the setting of desired steering feeling can be implemented. In addition, the filter characteristic of the first filtering unit 31 is fixed.

In contrast, the second filtering unit 41 applies filtering processing to the steering torque signal Strq outputted from the steering torque detector 1 and outputs a steering torque signal Strqf2 obtained through the filtering processing. In the case where the first filtering unit 31 has the frequency characteristic, as a filter characteristic, represented in FIG. 2, the second filtering unit 41 is formed of, for example, an analogue circuit illustrated in FIG. 3.

In other words, FIG. 3 includes an explanatory block diagram and explanatory graphs representing the configuration of the second filtering unit 41; FIGS. 3($a$), 3($b$), and 3($c$) represent the configuration of the second filtering unit, the gain vs. frequency characteristic thereof, and the phase vs. frequency characteristic thereof, respectively. As illustrated in FIG. 3, the second filtering unit 41 is provided with a first operational amplifier Amp1, a second operational amplifier Amp2, and a third operational amplifier Amp3 that are connected in series. The non-inverted input terminal of the first operational amplifier Amp1 is grounded; serially connected components consisting of a resistor R11 and a capacitor C11 that are connected in series with each other and a resistor R12 that is connected in parallel with the serially connected components are connected to the inverted input terminal of the first operational amplifier Amp1 that is connected to the output terminal of the steering torque detector 1. Serially connected components consisting of a resistor R21 and a capacitor C21 that are connected in series with each other and a resistor R22 that is connected in parallel with the serially connected components are connected between the output terminal and the inverted input terminal of the first operational amplifier Amp1. A resistor R22$a$ is connected between the inverted input terminal of the third operational amplifier Amp3 and the output terminal of the second operational amplifier Amp 2; a resistor R12$a$ is connected between the output terminal and the inverted input terminal of the third operational amplifier Amp3.

For example, the resistors R11, R12, R12$a$, R21, R22, and R22$a$ are 150 [kΩ], 24 [kΩ], 24 [kΩ], 18 [kΩ], 22 [kΩ], and 22 [kΩ], respectively; capacitors C11 and C21 are 0.022 [μF]

and 0.75 [μF], respectively. As represented in FIGS. 3(a) and 3(b), the transfer function of the second filtering unit 41 configured in such a manner has the frequency characteristic, as a filter characteristic, which is approximately the same as that of the first filtering unit 31 represented in FIG. 2.

Figure 4:
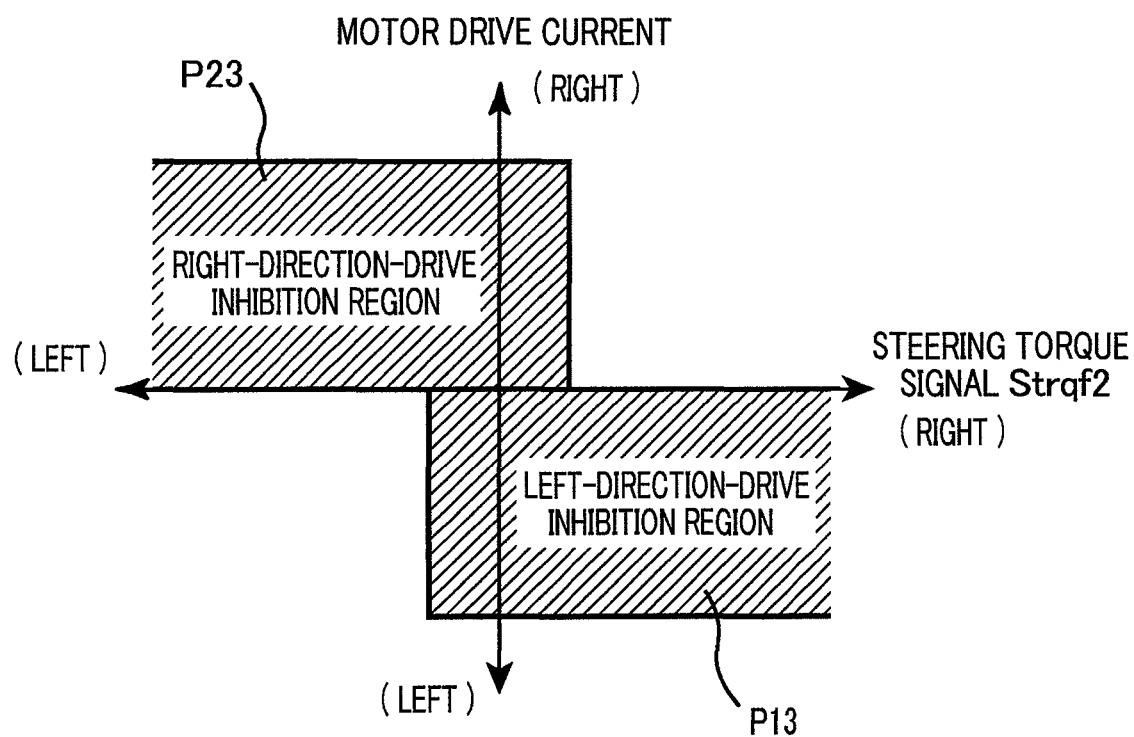
FIG. 4 is a chart representing drive inhibition regions set by an interlock unit in an electric power steering apparatus according to Embodiment 1 of the present invention.

In FIG. 1, the interlock unit 4 sets drive inhibition regions in accordance with the steering torque signal Strqf2 outputted from the second filtering unit 41. In this case, the difference between the steering torque signal Strqf2 that is inputted from the second filtering unit 41 to the interlock unit 4 and the steering torque signal Strqf1 that is inputted from the first filtering unit 31 to the target current calculation unit 32 is reduced, as described later. FIG. 4 is an explanatory chart representing examples of drive inhibition regions set by the interlock unit 4. In FIG. 4, the abscissa denotes the steering torque signal Strqf2, and the ordinate denotes the motor drive current Sti. As represented in FIG. 4, in the case where the steering torque signal Strqf2 indicates the right direction or the approximately neutral direction (the steering torque signal Strqf2 is close to "0", and the same applies hereinafter), it is determined, as represented by the region P13, that a predetermined drive in the left direction is inhibited; in the case where the steering torque signal Strqf2 indicates the left direction or the approximately neutral direction (the steering torque signal Strqf2 is close to "0", and the same applies hereinafter), it is determined, as represented by the region P23, that a predetermined drive in the right direction is inhibited. When determining that the steering torque signal Strqf2 corresponds to the right-direction-drive inhibition region P23, the interlock unit 4 outputs a right-direction-drive inhibition signal Sinhr as the motor drive inhibition signal; when determining that the steering torque signal Strqf2 corresponds to the left-direction-drive inhibition region P13, the interlock unit 4 outputs a left-direction-drive inhibition signal Sinhl as the motor drive inhibition signal.

As represented in FIG. 5, the motor drive unit 5 calculates the motor drive control signal Sdmtr, based on the right-direction-drive inhibition signal Sinhr and the left-direction-drive inhibition signal Sinhl that are outputted from the interlock unit 4 and the motor drive signal Stmtr that is outputted by the first microcomputer 3, and outputs the motor drive control signal Sdmtr so as to perform control on driving the motor 2 or on interrupting the drive of the motor 2. The relationship among the motor drive signal Stmtr, the right-direction-drive inhibition signal Sinhr, the left-direction-drive inhibition signal Sinhl, and the motor drive control signal Sdmtr is as represented in a table in FIG. 5; in accordance with the driving direction indicated by the motor drive signal Stmtr, "permission" or "inhibition" indicated by the left-direction-drive inhibition signal Sinhl, and "permission" or "inhibition" indicated by the right-direction-drive inhibition signal Sinhr, the contents of the control, on the driving direction or on the drive interruption, that is applied to the motor 2 by unit of the motor drive control signal Sdmtr are determined.

For example, in the case where the motor drive signal Stmtr indicates "right-direction drive", the left-direction-drive inhibition signal Sinhl indicates "permitted", and the right-direction-drive inhibition signal Sinhr indicates "inhibition", the motor drive control signal Sdmtr indicates "drive interruption". In addition, the motor drive unit 5 may be configured in such a way as to maintain the motor drive interrupted after the motor drive control signal Sdmtr once indicates "drive interruption".

FIG. 6 is an explanatory chart representing a target current that is set by the target current calculation unit 32, based on the steering torque signal Strqf1 obtained through filtering processing by the first filtering unit 31, and a drive inhibition region that is set by the interlock unit 4, based on the steering torque signal Strqf2 obtained through filtering processing by the second filtering unit 41. In FIG. 6, the abscissa denotes the steering torque signal Strqf2, and the ordinate denotes the target motor current Sti. In this case, as represented in FIG. 6, setting values C1 and C2 of the target current Sti fall neither into the right-direction-drive inhibition region P23 nor into the left-direction-drive inhibition region P13. Accordingly, control on driving the motor 2 or on interrupting the drive of the motor 2 can be performed without any failure caused by the conventional technology and the technology that is a basis of the present invention.

Next, the reason why the electric power steering apparatus according to Embodiment 1 of the present invention can perform control on driving the motor 2 or on interrupting the drive of the motor 2 without any failure caused by the conventional technology and the technology that is a basis of the present invention will be explained further in detail below.

First, a case will be explained in which the first filtering unit 41 outputs the steering torque signal Strqf2, without applying filtering processing to the steering torque signal Strq. This case is equivalent to the technology, without the second filtering unit 41, that is a basis of the present invention. FIG. 7 is a waveform graph representing the steering torque signal in the case where filtering processing by a second filtering unit 41 is not performed; a case is represented in which a sinusoidal-wave steering torque signal Strq having a frequency of 10 [Hz] is inputted to the first filtering unit 31 and the second filtering unit 41.

As represented in FIG. 7, in the case where the sinusoidal-wave steering torque signal Strq having a frequency of 10 [Hz] is inputted from the steering torque detector 1 to the first filtering unit 31, the steering torque signal Strqf1 obtained through filtering processing by the first filtering unit 31 is reduced in amplitude and delayed in phase with respect to the steering torque signal Strq. In contrast, the amplitude and the phase of the steering torque signal Strqf2 outputted from the second filtering unit 41 are the same as those of the steering torque signal Strq, because no filtering processing by the second filtering unit 41 is applied to the steering torque signal Strq.

Figure 8:
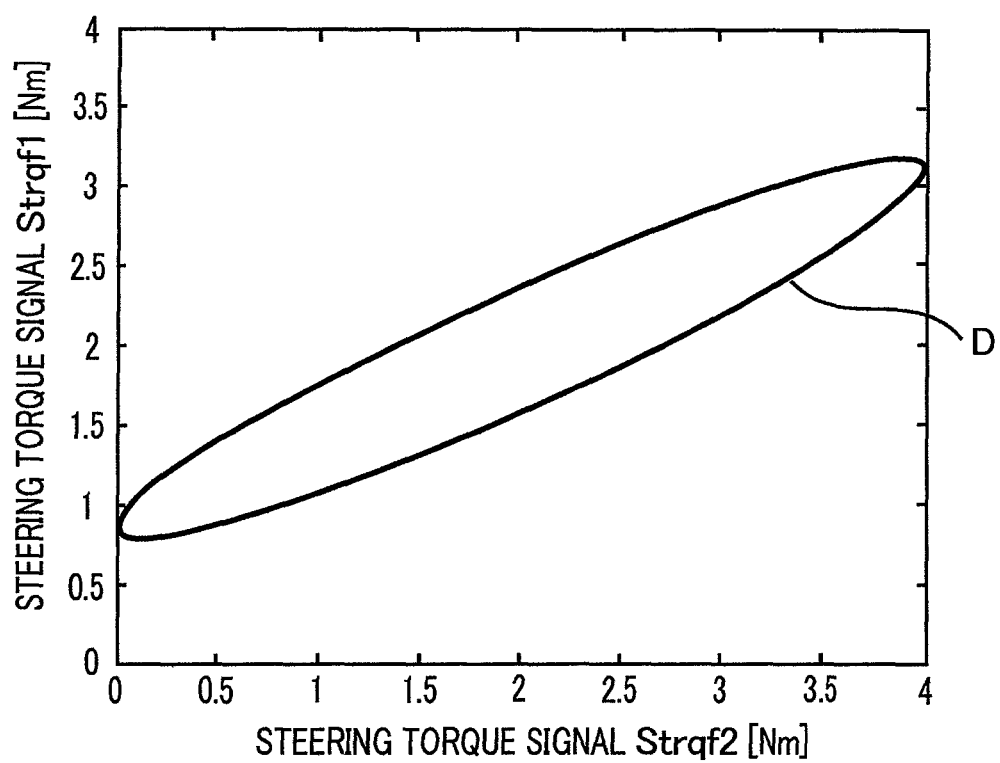
FIG. 8 is a graph representing the relationship between a steering torque signal to which filtering processing has not been applied by a second filtering unit and a steering torque signal obtained through filtering processing by a first filtering unit.

FIG. 8 is a graph representing the relationship between the steering torque signal Strqf2 obtained without filtering processing being performed by the second filtering unit 41 and the steering torque signal Strqf1 obtained through filtering processing by the first filtering unit 31, in the case where the steering torque signal Strq is a sinusoidal wave of 10 [Hz]. As represented in FIG. 8, the relationship between the steering torque signal Strqf1 and the steering torque signal Strqf2 is shown by the solid line D.

FIG. 9 is an explanatory chart representing the target current Sti that is set by the target current calculation unit 32, based on the steering torque signal Strqf1 obtained through filtering processing, and the drive inhibition region P23 that is set by the interlock unit 4, based on the steering torque signal Strqf2 obtained without filtering processing being performed, in the case where the steering torque signal Strq is a sinusoidal wave of 10 [Hz]; the abscissa denotes the steering torque signal Strqf2, and the ordinate denotes the target current Sti. In addition, the area, in the ordinate direction, of the right-direction-drive inhibition region P23 represented in FIG. 9 is only part of the overall range, in the ordinate direction, of the right-direction-drive inhibition region P23 represented in FIG. 6.

As described above, the target current Sti is set by the target current calculation unit 32, based on the steering torque signal Strqf1 obtained through filtering processing by the first filtering unit 31; therefore, in the case where the steering torque signal Strqf1 and the steering torque signal Strqf2 are equal to each other, the target current Sti for the steering torque signal Strqf2 becomes C1 represented by the broken line in FIG. 9.

However, the steering torque signal Strqf2 obtained without filtering processing being performed and the steering torque signal Strqf1 obtained through filtering processing are not equal to each other, but in the relationship represented in FIG. 8; therefore, the target current Sti for the steering torque signal Strqf2 is represented by the solid line E.

As a result, as indicated by X in FIG. 9, when the steering torque signal Strqf2 decreases to approximately 1.5 [Nm], the target current Sti falls into the right-direction-drive inhibition region P23 set by the interlock unit 4, even though being the same as or larger than 0 A. Accordingly, although to be driven in accordance with the target current Sti, the motor 2 is inhibited from being driven; thus, the stability of the steering system may not be ensured, and setting of desired steering feeling may not be implemented.

Next, an electric power steering apparatus according to Embodiment 1 of the present invention will be explained. FIG. 10 is a waveform graph representing a steering torque signal in the electric power steering apparatus according to Embodiment 1 of the present invention; a case is represented in which a sinusoidal-wave steering torque signal Strq having a frequency of 10 [Hz] is inputted to the first filtering unit 31 and the second filtering unit 41. As described above, the second filtering unit 41 has filter characteristic approximately the same as that of the first filtering unit 31; therefore, as represented in FIG. 10, in the case where a sinusoidal-wave steering torque signal Strq of 10 [Hz] is inputted, the waveform of the steering torque signal Strqf1 obtained through filtering processing by the first filtering unit 31 and the waveform of the steering torque signal Strqf2 obtained through filtering processing by the second filtering unit 41 become approximately equal to each other, whereby both the steering torque signal Strqf1 and the steering torque signal Strqf2 are similarly reduced in amplitude and similarly delayed in phase with respect to the steering torque Strq.

FIG. 11 is a graph representing the relationship between the steering torque signal Strqf2 and the steering torque signal Strqf1 in the electric power steering apparatus according to Embodiment 1 of the present invention. The steering torque signal Strqf2 obtained through filtering processing by the second filtering unit 41 is approximately the same as the steering torque signal Strqf1 obtained through the filtering processing by the first filtering unit 31; the relationship between them is proportional, as represented by the solid line F in FIG. 11.

Figure 12:
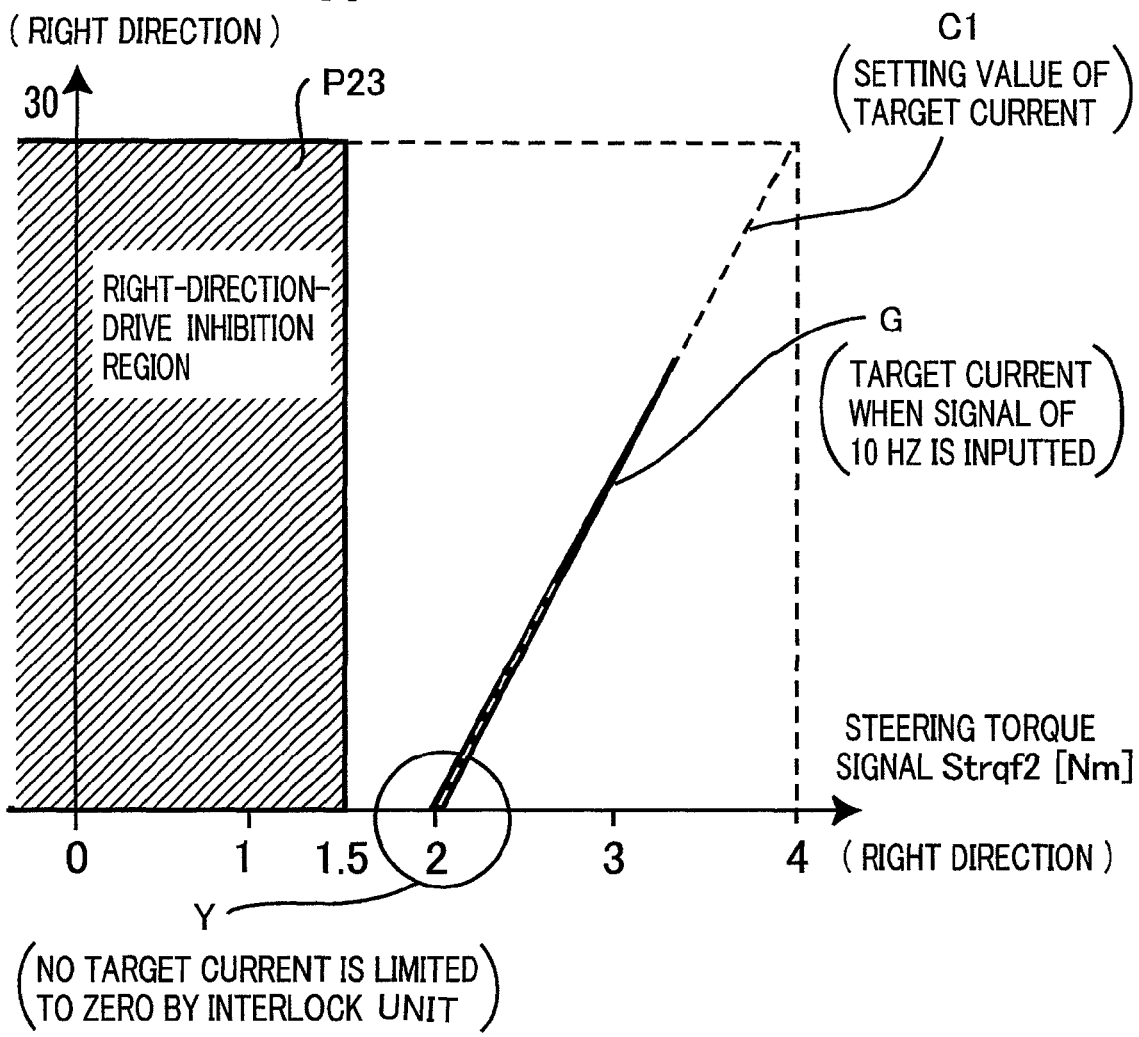
FIG. 12 is an explanatory chart representing a target current and a drive inhibition region in an electric power steering apparatus according to Embodiment 1 of the present invention.

FIG. 12 is an explanatory chart representing a target current Sti that is set by the target current calculation unit 32, based on the steering torque signal Strqf1 obtained through filtering processing by the first filtering unit 31, and the drive inhibition region P23 that is set by the interlock unit 4, based on the steering torque signal Strqf2 obtained through filtering processing by the second filtering unit 41, in the case where the steering torque signal Strq is a sinusoidal wave of 10 [Hz]; the abscissa denotes the steering torque signal Strqf2, and the ordinate denotes the target current Sti. In addition, the area, in the ordinate direction, of the right-direction-drive inhibition region P23 represented in FIG. 12 is only part of the overall range, in the ordinate direction, of the right-direction-drive inhibition region P23 represented in FIG. 6.

In the electric power steering apparatus according to Embodiment 1 of the present invention, because the steering torque signal Strqf2 and the steering torque signal Strqf1 are approximately equal to each other and in a proportional relationship as represented in FIG. 11, the target current Sti for the steering torque signal Strqf2 is represented, as represented in FIG. 12, by the solid line G that overlaps the set target current C1. Therefore, as indicated by Y in FIG. 12, even when the steering torque signal Strqf2 decreases to approximately 2.0 [Nm], the target current Sti does not fall into the right-direction-drive inhibition region P23, and thereby there exists no case where, although to be driven in accordance with the target current Sti, the motor 2 is inhibited from being driven; as a result, the stability of the steering system can be ensured, and setting of desired steering feeling can be implemented.

As described above, in the electric power steering apparatus according to Embodiment 1 of the present invention, the steering torque signal Strqf2 obtained through filtering processing by the second filtering unit 41 is approximately the same as the steering torque signal Strqf1 obtained through the filtering processing by the first filtering unit 31; therefore, unlike the conventional apparatus or the technology that is a basis of the present invention, the interlock unit 4 does not inhibit the motor 2 from being driven, in the case where the microcomputer 3 normally calculates the target current, whereby there is realized an electric power steering apparatus capable of ensuring the stability of a steering system and capable of setting of desired steering feeling. As a result, there is realized an electric power steering apparatus in which the motor 2 is driven in such a way as to reduce steering torque exerted by the driver, but the motor 2 is inhibited from being driven in such a way as to increase steering torque exerted by the driver.

Embodiment 2

In Embodiment 1, the filter characteristic of the first filtering unit 31 is fixed; however, in an electric power steering apparatus according to Embodiment 2 of the present invention, the filter characteristic of the first filtering unit 31 is switched in accordance with a vehicle driving condition recognized through a steering torque signal, a vehicle speed signal, a steering speed signal, or the like.

Figure 13:
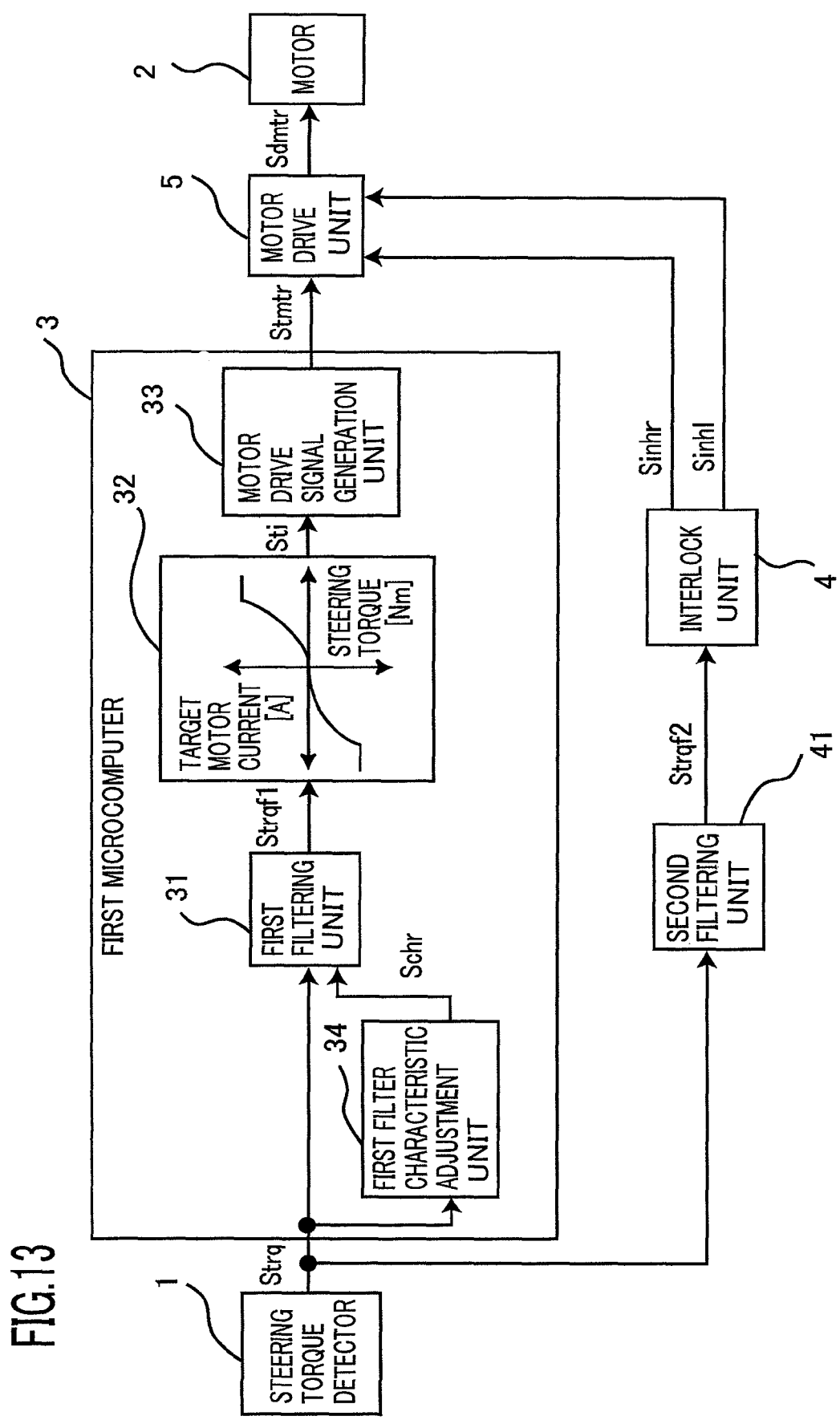
FIG. 13 is a block diagram illustrating the configuration of an electric power steering apparatus according to Embodiment 2 of the present invention.

FIG. 13 is a block diagram of an electric power steering apparatus according to Embodiment 2 of the present invention. In FIG. 13, a first filter characteristic adjustment unit 34 adjusts the filter characteristic of the first filtering unit 31, in accordance with a vehicle driving condition recognized through a steering torque signal, a vehicle speed signal, a steering speed signal, or the like.

The first filter characteristic adjustment unit 34 outputs three kinds of filter characteristic selection signals, in accordance with the steering torque signal Strq from the steering torque detector 1. In the case where the steering torque signal Strq is from 0 [Nm] to a value less than 2 [Nm], the first filter characteristic adjustment unit 34 gives a signal indicating a range "A" to the first filtering unit 31. In the case where the steering torque signal Strq is from 2 [Nm] to a value less than 5 [Nm], the first filter characteristic adjustment unit 34 gives a signal indicating a range "B" to the first filtering unit 31. In the case where the steering torque signal Strq is the same as or larger than 5 [Nm], the first filter characteristic adjustment unit 34 gives a signal indicating a range "C" to the first filtering unit 31.

A first filtering unit 31 is provided, as described later, with a first filter structure F1, a second filter structure F2, and a third filter structure F3 for performing filtering processings by use of different filter characteristics, and selects the filter structure for performing filtering processing, in accordance with the filter characteristic selection signal Schr from the first filter characteristic adjustment unit 34. FIG. 14 includes an explanatory table and three explanatory diagrams representing the configuration of the first filtering unit 31; FIG. 14(*a*) is a table representing the correspondence between the filter characteristic selection signal Schr and the filter characteristic; FIG. 14(*b*) is the configuration of the first filtering unit 31; FIG. 14(*c*) represents the gain vs. selected frequency characteristic thereof; FIG. 14(*d*) represents the phase vs. frequency characteristic thereof. In FIG. 14(*b*), switches S1 and S2 each select one of the first filter structure F1, the second filter structure F2, and the third filter structure F3, in accordance with the filter characteristic selection signal Schr from the first filter characteristic adjustment unit 34.

The first microcomputer 3 includes the first filter structure F1 having a first filter characteristic A1, the second filter structure F2 having a second filter characteristic B1, and the third filter structure F3 having a third filter characteristic C1. The differences among the respective gain vs. frequency characteristics and the respective phase vs. frequency characteristics of the first filter structure F1, the second filter structure F2, and the third filter structure F3 are as represented in FIGS. 14(*c*) and 14(*d*).

In the case where the filter characteristic selection signal Schr outputted from the first filter characteristic adjustment unit 34 falls into the range "A", the switches S1 and S2 each select the first filter structure F1; in the case where the filter characteristic selection signal Schr falls into the range "B", the switches S1 and S2 each select the second filter structure F2; in the case where the filter characteristic selection signal Schr falls into the range "C", the switches S1 and S2 each select the third filter structure F3. In other words, the filter characteristic of the first filtering unit 31 changes as represented in FIG. 14(*a*), in accordance with the filter characteristic selection signal Schr outputted from the first filter characteristic adjustment unit 34. As a result, the steering torque signal Strqf1 obtained through filtering processing by the first filtering unit 31 has a value obtained through filtering processing by use of the selected filter characteristic.

Figure 15:
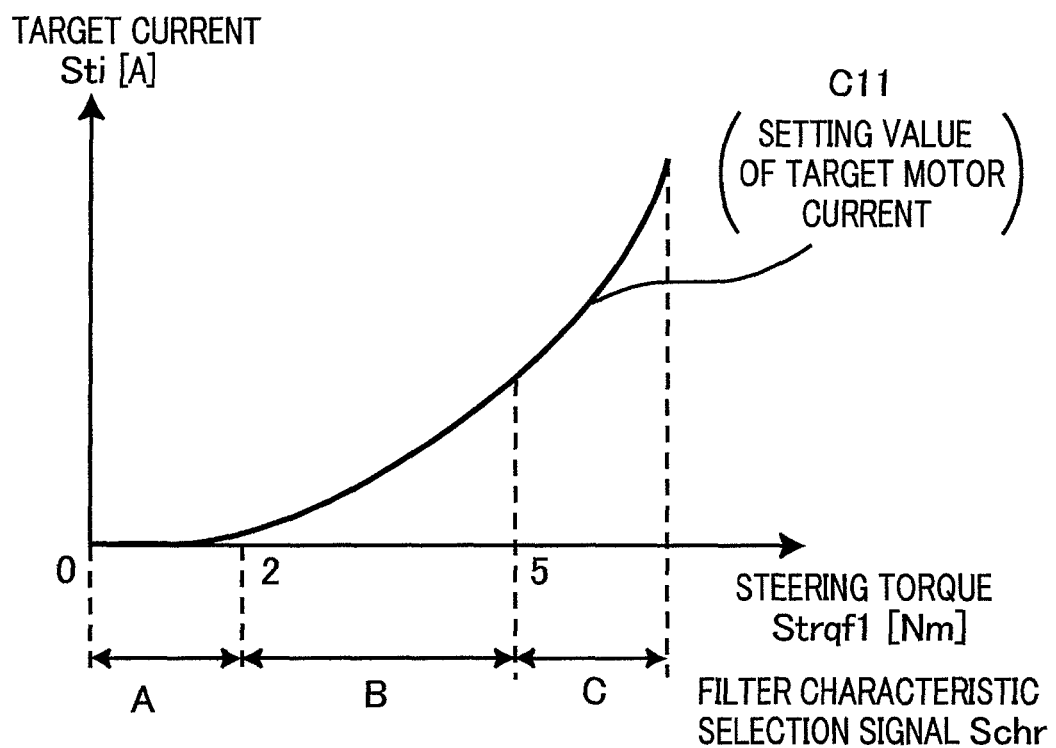
FIG. 15 is an explanatory graph representing the relationship between a steering torque signal and a target current in an electric power steering apparatus according to Embodiment 2 of the present invention, in the case where the filter characteristic of a first filtering unit is adjusted, based on a filter characteristic selection signal from a first filter characteristic adjustment unit.

FIG. 15 is an explanatory graph representing the relationship between the steering torque signal Strqf1 and the target current Sti, in the case where the filter characteristic of the first filtering unit 31 is adjusted, based on the filter characteristic selection signal Schr outputted from the first filter characteristic adjustment unit 34; the abscissa denotes the steering torque signal Strqf1, and the ordinate denotes the target current Sti. As shown in FIG. 15, in this case, the characteristic of the target motor current setting value is represented by the curve C11.

Figure 16:
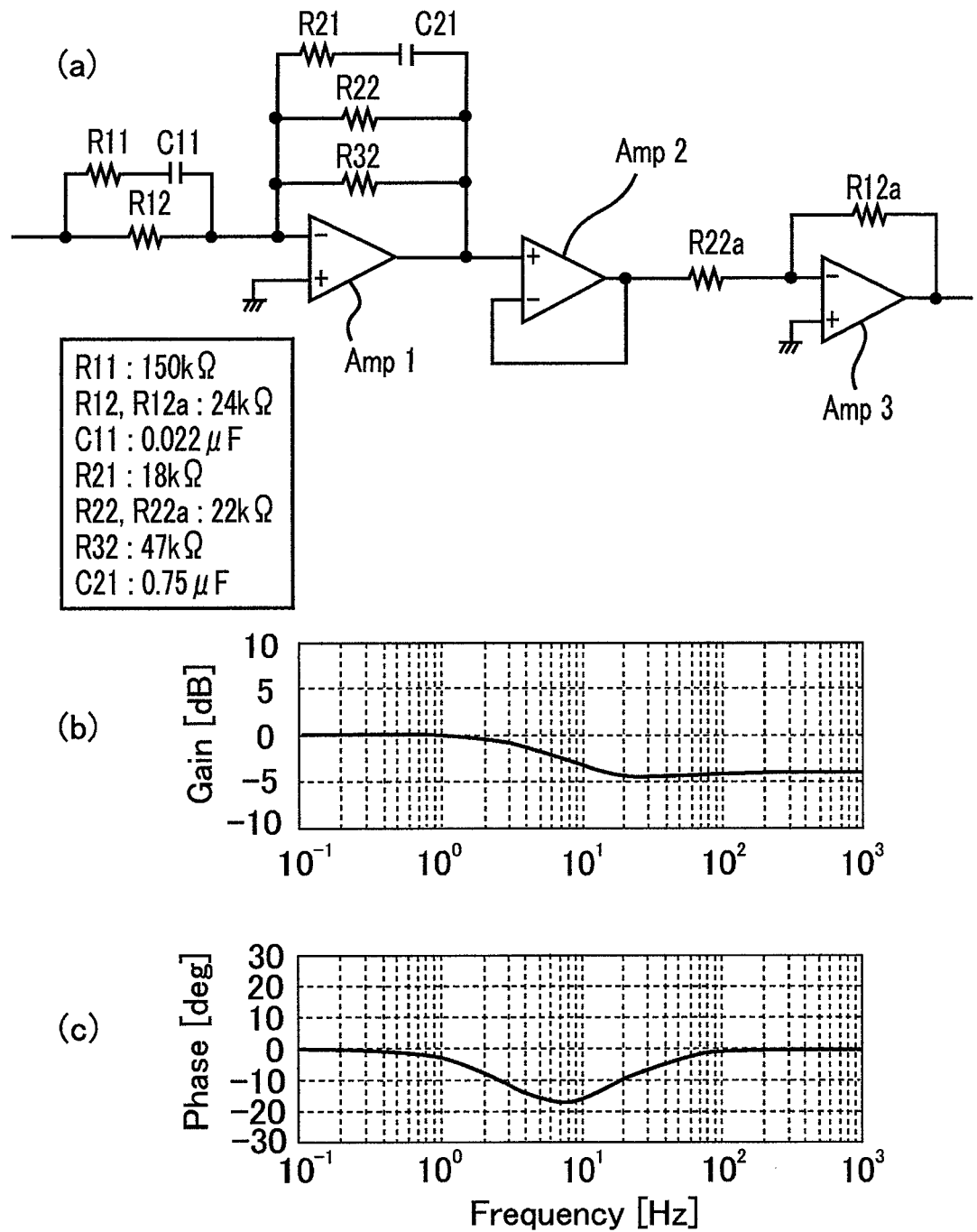
FIG. 16 includes an explanatory diagram and explanatory graphs representing the configuration of a second filtering unit in an electric power steering apparatus according to Embodiment 2 of the present invention.

In contrast, the second filtering unit 41 is configured in such a way as to have the filter characteristic close to that of the filter characteristic B1 of the second filter structure F2 so that the effect of the switching of the filter characteristic of the first filtering unit 31 is reduced. FIG. 16 includes an explanatory circuit diagram and explanatory graphs representing the configuration of the second filtering unit 41; FIG. 16(*a*) illustrates the configuration of the second filtering unit 41; FIG. 16(*b*) represents the gain vs. frequency characteristic thereof; FIG. 16(*c*) represents the phase vs. frequency characteristic thereof.

As illustrated in FIG. 16(*a*), the second filtering unit 41 is provided with a first operational amplifier Amp1, a second operational amplifier Amp2, and a third operational amplifier Amp3 that are connected in series. The non-inverted input terminal of the first operational amplifier Amp1 is grounded; serially connected components consisting of a resistor R11 and a capacitor C11 that are connected in series with each other and a resistor R12 that is connected in parallel with the serially connected components are connected to the inverted input terminal, of the first operational amplifier Amp1, that is connected to the output terminal of the steering torque detector 1. Serially connected components consisting of a resistor R21 and a capacitor C21 that are connected in series with each other and a resistor R22 that is connected in parallel with the serially connected components are connected between the output terminal and the inverted input terminal of the first operational amplifier Amp1. A resistor R22a is connected between the inverted input terminal of the third operational amplifier Amp3 and the output terminal of the second operational amplifier Amp 2; a resistor R12a is connected between the output terminal and the inverted input terminal of the third operational amplifier Amp3.

For example, the resistors R11, R12, R12a, R21, R22, and R22a are 150 [kΩ], 24 [kΩ], 24 [kΩ], 18 [kΩ], 22 [kΩ], and 22 [kΩ], respectively; capacitors C11 and C21 are 0.022 [μF] and 0.75 [μF], respectively. As represented in FIGS. 16(*a*) and 3(*b*), the transfer function of the second filtering unit 41 configured in such a manner has a frequency characteristic similar to that of the filter characteristic B1, represented in FIG. 14, of the second filter structure F2 for the first filtering unit 31. The filter characteristic of the second filtering unit 41 is fixed.

In the electric power steering apparatus, according to Embodiment 2 of the Invention, which is configured as described above, the switches S1 and S2 are switched in accordance with a vehicle driving condition recognized through the steering torque signal based on steering torque detected by the steering torque detector 1, the speed signal based on a vehicle speed, the steering speed signal corresponding to a steering speed, or the like; one of the first through third filter structures F1 through F3 for the first filtering unit 31 is selected; and one of the filter characteristics A1, B1, and C1 for applying filtering processing to the steering torque signal Strq is selected. In the case where the detected vehicle speed is high, or in the case where the steering speed is high, the filter characteristic A1 is selected; in the case where the detected vehicle speed is low, or in the case where the steering speed is low, the filter characteristic C1 is selected. In the case where the vehicle is in an ordinary condition, the filter characteristic B1, which is an intermediate characteristic, is selected.

As described above, the filter characteristic of the second filtering unit 41 is approximately the same as that of the intermediate characteristic within a range in which the filter characteristic of the first filtering unit 31 can vary, i.e., the filter characteristic B1; therefore, in the case where the first filtering unit 31 applies filtering processing to the steering torque signal Strq by use of the filter characteristic B1 of the second filter structure F2, the steering torque signal Strqf2 obtained through filtering processing by the second filtering unit 41 is approximately the same as the steering torque signal Strqf1 obtained through the filtering processing by the first filtering unit 31. Accordingly, as is the case with Embodiment 1, unlike the conventional apparatus or the technology that is a basis of the present invention, the interlock unit 4 does not inhibit the motor 2 from being driven, in the case where the microcomputer 3 normally calculates the target current, whereby there is realized an electric power steering apparatus capable of ensuring the stability of a steering system and capable of setting of desired steering feeling.

Even in the case where the first filtering unit 31 applies filtering processing to the steering torque signal Strq by use of the first filter characteristic A1 of the first filter structure F1, or even in the case where the first filtering unit 31 applies filtering processing to the steering torque signal Strq by use of the third filter characteristic C1 of the third filter structure F3, as described above, the filter characteristic of the second filtering unit 41 is made to be approximately the same as that of the first filter characteristic A1 or the third filter characteristic C1; therefore, as is the case with Embodiment 1, unlike the conventional apparatus or the technology that is a basis of the present invention, the interlock unit 4 does not inhibit the motor 2 from being driven, in the case where the microcomputer 3 normally calculates the target current, whereby there can be realized an electric power steering apparatus capable of ensuring the stability of a steering system and capable of setting of desired steering feeling.

As described above, in the electric power steering apparatus according to Embodiment 2 of the present invention, the optimal filter characteristic can be selected in accordance with a vehicle driving condition recognized through the steering torque signal, the vehicle speed signal, the steering speed signal, or the like; therefore, there can be realized an electric power steering apparatus capable of more securely ensuring the stability of a steering system and capable of setting of desired steering feeling.

Embodiment 3

In Embodiment 2, the filter characteristic of the second filtering unit 41 is fixed; however, in an electric power steering apparatus according to Embodiment 3 of the present invention, the filter characteristic of the first filtering unit 31 and the filter characteristic of the second filtering unit 41 are switched in accordance with a vehicle driving condition recognized through a steering torque signal, a vehicle speed signal, a steering speed signal, or the like.

Figure 17:
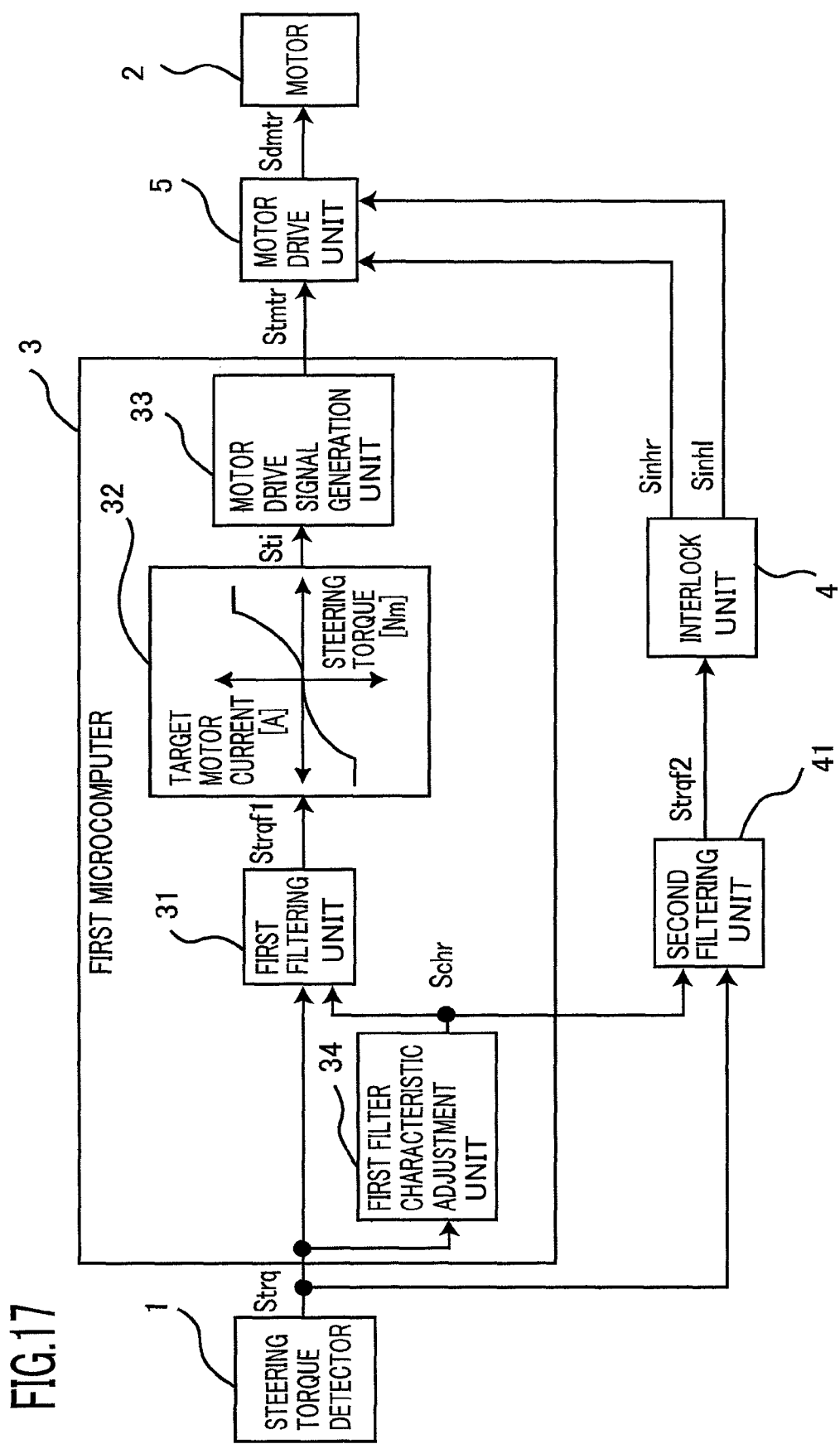
FIG. 17 is a block diagram illustrating the configuration of an electric power steering apparatus according to Embodiment 3 of the present invention.

FIG. 17 is a block diagram for an electric power steering apparatus according to Embodiment 3 of the present invention. In FIG. 17, the first filter characteristic adjustment unit 34 adjusts the filter characteristic of the first filtering unit 31 and the filter characteristic of the second filtering unit 41. The configurations of the first filter characteristic adjustment unit 34 and the first filtering unit 31 are the same as those in Embodiment 2; however, the first filter characteristic adjustment unit 34 supplies the filter characteristic selection signal Schr, which is an output thereof, also to the second filtering unit 41.

Figure 18:
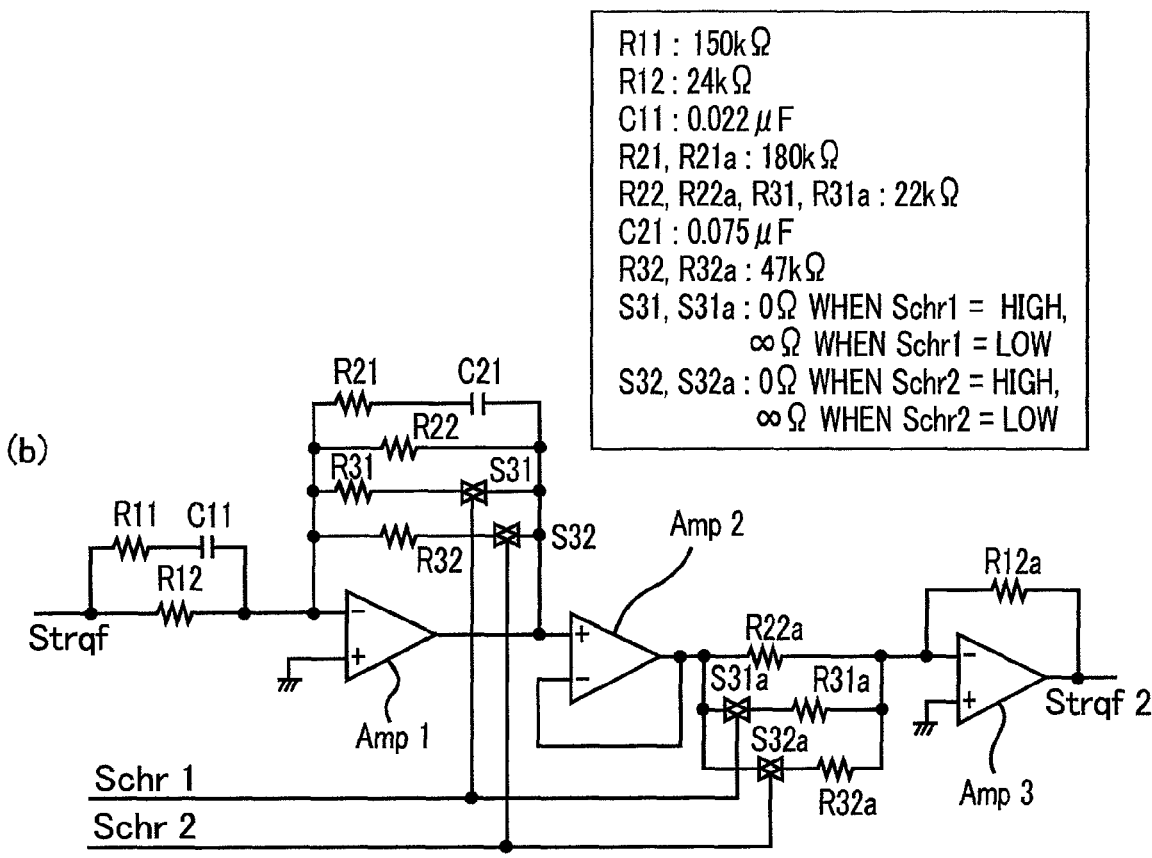
FIG. 18 includes an explanatory table and an explanatory diagram representing the configuration of a second filtering unit in an electric power steering apparatus according to Embodiment 3 of the present invention.

FIG. 18 includes an explanatory table and a circuit diagram representing the configuration of the second filtering unit 41; FIG. 18(a) is a table representing the correspondence between the filter characteristic selection signal Schr and the filter characteristic; FIG. 18(b) is the configuration of the second filtering unit 41. As illustrated in FIG. 18(b), the second filtering unit 41 is provided with a first operational amplifier Amp1, a second operational amplifier Amp2, and a third operational amplifier Amp3 that are connected in series. The non-inverted input terminal of the first operational amplifier Amp1 is grounded; serially connected components consisting of a resistor R11 and a capacitor C11 that are connected in series with each other and a resistor R12 that is connected in parallel with the serially connected components are connected to the inverted input terminal of the first operational amplifier Amp1 that is connected to the output terminal of the steering torque detector 1. Serially connected components consisting of a resistor R21 and a capacitor C21 that are connected in series with each other and a resistor R22 that is connected in parallel with the serially connected components are connected between the output terminal and the inverted input terminal of the first operational amplifier Amp1; furthermore, serially connected components consisting of a resistor R31 and a first analogue switch S31 and serially connected components consisting of a resistor R32 and a second analogue switch S32 are connected in parallel with the resistor R22.

A resistor R22a, serially connected components consisting of a resistor R31a and a third analogue switch S31a, connected in parallel with the resistor R22a, and serially connected components consisting of a resistor R32a and a fourth analogue switch S32a, connected in parallel with the resistor R22a are connected between the output terminal of the second operational amplifier Amp2 and the inverted input terminal of the third operational amplifier Amp3. A resistor R12a is connected between the output terminal and the inverted input terminal of the third operational amplifier Amp3.

For example, the resistors R11, R12, R21, R21a, R22, and R22a, R31, R31a, R32, and R32a are 150 [kΩ], 24 [kΩ], 180 [kΩ], 180 [kΩ], 22 [kΩ], 22 [kΩ], 22 [kΩ], 22 [kΩ], 47 [kΩ], and 47 [kΩ], respectively; capacitors C11 and C21 are 0.022 [μF] and 0.075 [μF], respectively.

The first analogue switch S31 and the third analogue switch S31a are formed in such a way that the resistance values thereof are switched by a first logic signal Schr1 generated from the filter characteristic selection signal Schr, which is an output signal of the first filter characteristic adjustment unit 34; their resistance values become 0 [Ω] when the first logic signal Schr1 is high-level, and ∞ [Ω] when the first logic signal Schr1 is low-level. Additionally, the second analogue switch S32 and the fourth analogue switch S32a are formed in such a way that the resistance values thereof are switched by a second logic signal Schr2 generated from the filter characteristic selection signal Schr, which is an output signal of the first filter characteristic adjustment unit 34; their resistance values become 0 [Ω] when the second logic signal Schr2 is high-level, and ∞ [Ω] when the second logic signal Schr2 is low-level.

AS represented in FIG. 18(a), in the case where the filter characteristic selection signal Schr is within the range "A" represented in FIG. 15, the first logic signal Schr1 becomes high-level, and the second logic signal Schr2 becomes low-level. In the case where the filter characteristic selection signal Schr is within the range "B" represented in FIG. 15, the first logic signal Schr1 becomes low-level, and the second logic signal Schr2 becomes high-level. In the case where the filter characteristic selection signal Schr is within the range "C" represented in FIG. 15, both the first logic signal Schr1 and the second logic signal Schr2 become low-level.

As a result, in the second filtering unit 41, based on the first logic signal Scgr1 and the second logic signal Schr2 generated from the filter characteristic selection signal Schr, the resistors R31 and R32 are connected in parallel with or disconnected from the resistor R22; concurrently, the resistors R31a and R32a are connected in parallel with or disconnected from the resistor R22a.

For example, in FIG. 18, in the case where the value of the filter characteristic selection signal Schr is within "A", the first logic signal Schr1 becomes high-level, and the second logic signal Schr2 becomes low-level; the first analogue switch S31 and the third analogue switch S31 turn on; and the second analogue switch S32 and the fourth analogue switch S32a turn off. Accordingly, the resistors R22 and R31 configure a parallel circuit and the resistors R22a and R31a configure a parallel circuit, whereby the resistors R32 and R32a are disconnected.

In the case where the value of the filter characteristic selection signal Schr is within "B", the first logic signal Schr1 becomes low-level, and the second logic signal Schr2 becomes high-level; the second analogue switch S32 and the fourth analogue switch S32a turn on; and the first analogue switch S31 and the third analogue switch S31a turn off. Accordingly, the resistors R22 and R32 configure a parallel circuit and the resistors R22a and R32a configure a parallel circuit, whereby the resistors R31 and R31a are disconnected. In the case where the value of the filter characteristic selection signal Schr is within "C", both the first logic signal Schr1 and the second logic signal Schr2 become low-level; the first, second, third, and fourth analogue switches S31, S32, S31a, and S32a all turn off; therefore, neither the resistors R31 and R32 are connected in parallel with the resistor R22, nor the resistors R31a and R32a are connected in parallel with the resistor R22a.

Figure 19:
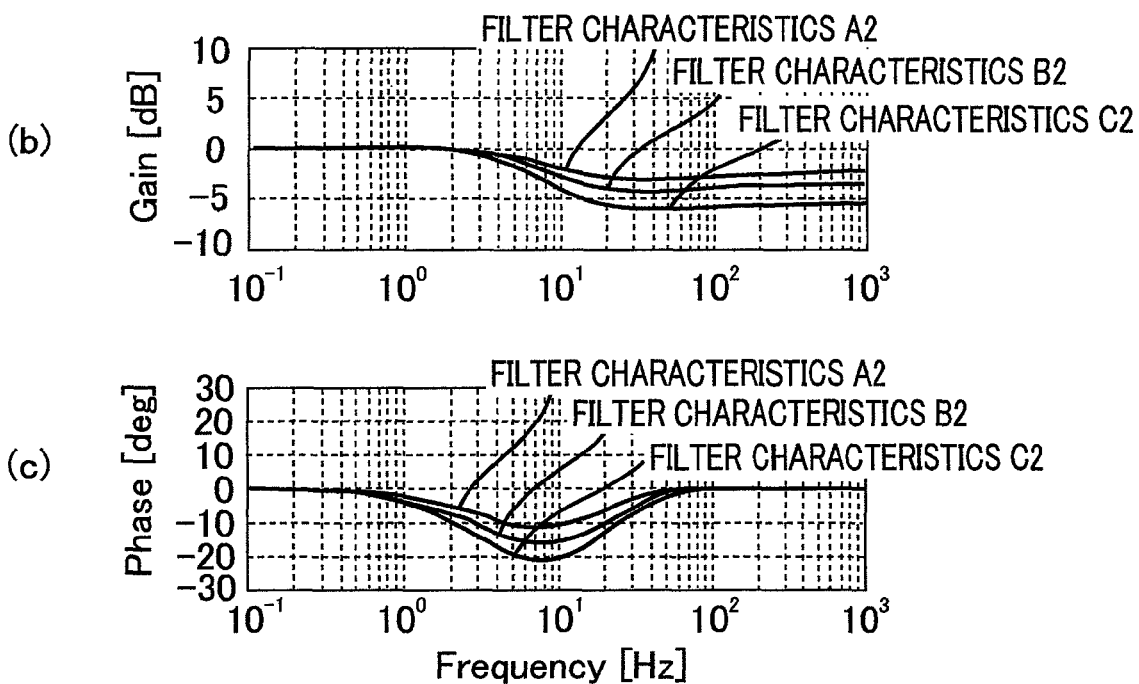
FIG. 19 includes an explanatory table and an explanatory graphs representing the filter characteristic of a second filtering unit in an electric power steering apparatus according to Embodiment 3 of the present invention.

As described above, the values of the resistors connected with the operational amplifiers of the second filtering unit 41 can be changed; therefore, as represented in FIG. 18(a), one of the filter characteristics A2, B2, and C2 can be selected, as the filter characteristic of the second filtering unit 41. FIG. 19 includes an explanatory table and explanatory graphs representing the filter characteristics A2, B2, and C2 of the second filtering unit 41; FIG. 19(a) is a table representing the filter characteristic of the second filtering unit 41, selected in accordance with the value of the filter characteristic selection signal Schr; FIG. 19(b) represents the respective gain vs. frequency characteristics of the filter characteristics A2, B2, and C2; FIG. 19(c) represents the respective phase vs. frequency characteristics of the filter characteristics A2, B2, and C2.

In contrast, the first filtering unit 31 is configured in the same manner as in Embodiment 2; as represented in FIG. 14, one of the filter characteristics A1, B1, and C1 can be selected, in accordance with the value "A", "B", or "C" of the filter characteristic selection signal Schr.

In this situation, the filter characteristics A2, B2, and C2 of the second filtering unit 41 correspond to the filter characteristics A1, B1, and C1, respectively, of the first filtering unit 31, and the corresponding filter characteristics are set in such a way as to be the same as or similar to each other. In the case where the first filtering unit 31 selects the filter characteristic A1 in accordance with the value of the filter characteristic selection signal Schr, the second filtering unit 41 selects the filter characteristic A2; in the case where the first filtering unit 31 selects the filter characteristic B1, the second filtering unit 41 selects the filter characteristic B2; in the case where the first filtering unit 31 selects the filter characteristic C1, the second filtering unit 41 selects the filter characteristic C2.

As a result, the steering torque signal Strqf1 obtained through filtering processing by the first filtering unit 31 and the steering torque signal Strqf2 obtained through filtering processing by the second filtering unit 41 always have approximately the same values or similar values; therefore, unlike the conventional apparatus or the technology that is a basis of the present invention, the interlock unit 4 does not inhibit the motor 2 from being driven, in the case where the microcomputer 3 normally calculates the target current, whereby there can be realized an electric power steering apparatus capable of ensuring the stability of a steering system and capable of setting of desired steering feeling.

As described above, in the electric power steering apparatus according to Embodiment 3 of the present invention, an optimal filter characteristic can be selected in accordance with a vehicle condition recognized through the steering torque signal, the vehicle speed signal, the steering speed signal, or the like; therefore, there can be realized an electric power steering apparatus capable of more securely ensuring the stability of a steering system and capable of setting of desired steering feeling.

Embodiment 4

In Embodiments 1 through 3, the second filtering unit 41 is formed of an analogue circuit; however, in an electric power steering apparatus according to Embodiment 4 of the present invention, the second filtering unit 41 and the interlock unit 4 are formed of a digital circuit, a microcomputer, or the like.

Figure 20:
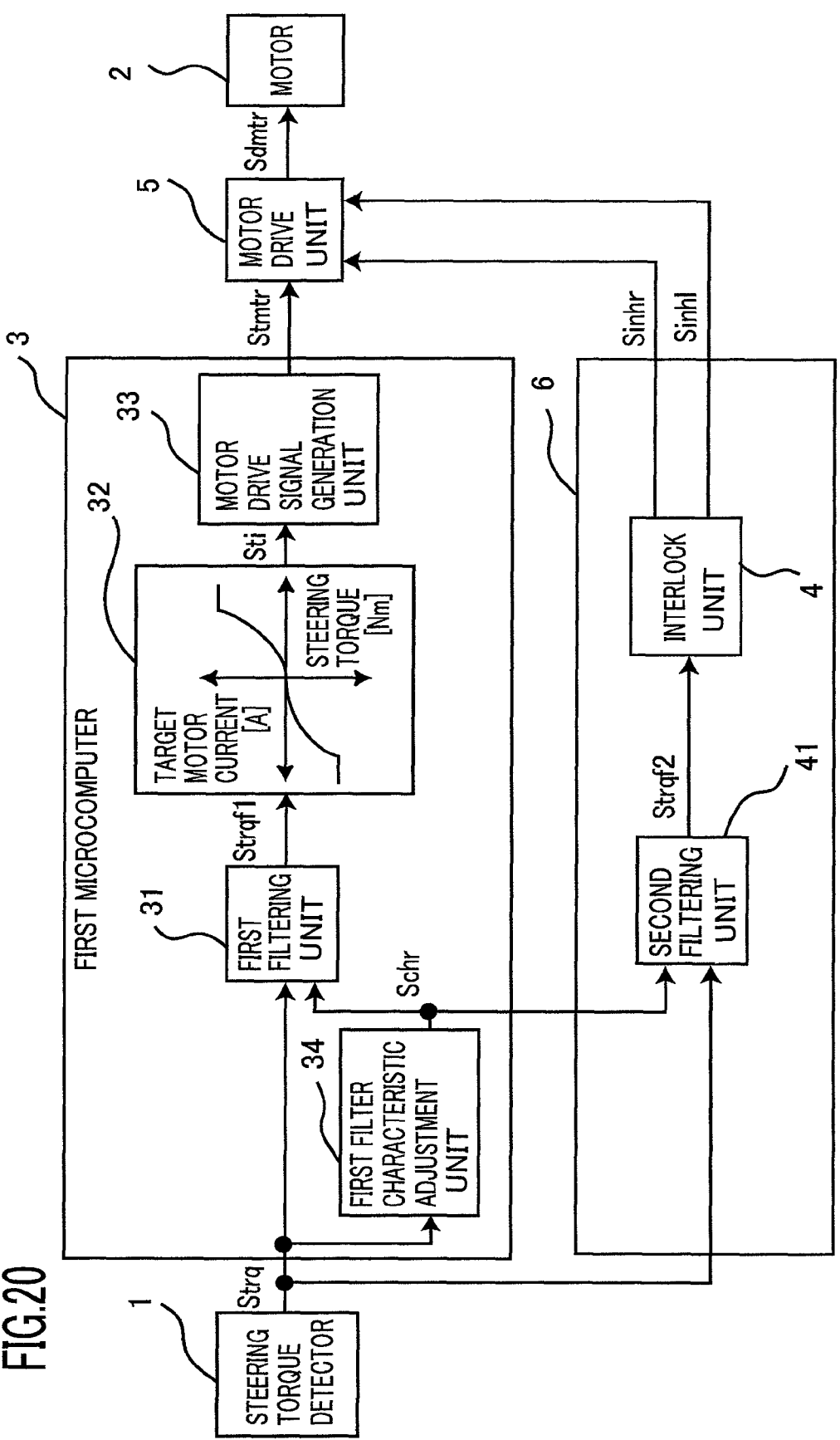
FIG. 20 is a block diagram illustrating the configuration of an electric power steering apparatus according to Embodiment 4 of the present invention.

FIG. 20 is a block diagram for an electric power steering apparatus according to Embodiment 4 of the present invention. In FIG. 20, the second filtering unit 41 and the interlock unit 4 are included in a second microcomputer 6. The second filtering unit 41 is configured in the same manner as the first filtering unit 31. The filter characteristic selection signal Schr obtained through calculation by the first filter characteristic adjustment unit 34 is inputted to the second filtering unit 41 by unit of serial communication or the like. Other configurations are the same as those in Embodiment 3.

In the electric power steering apparatus according to Embodiment 4 of the present invention, an optimal filter characteristic can be selected in accordance with a vehicle driving condition recognized through the steering torque signal, the vehicle speed signal, the steering speed signal, or the like; and the respective filter characteristics of the second filtering unit 41 and the first filtering unit 31 can be made to be the same as each other. Therefore, there can be realized an electric power steering apparatus capable of more securely ensuring the stability of a steering system and capable of more securely setting of desired steering feeling, compared with Embodiments 1 and 2.

Embodiment 5

In Embodiment 4, after being calculated by the first microcomputer 3, the filter characteristic selection signal Schr is inputted to the second filtering unit 41 by unit of serial communication or the like; however, in an electric power steering apparatus according to Embodiment 5 of the present invention, a second filter characteristic adjustment unit configured in the same manner as the first filter characteristic adjustment unit is included in the second microcomputer 6.

Figure 21:
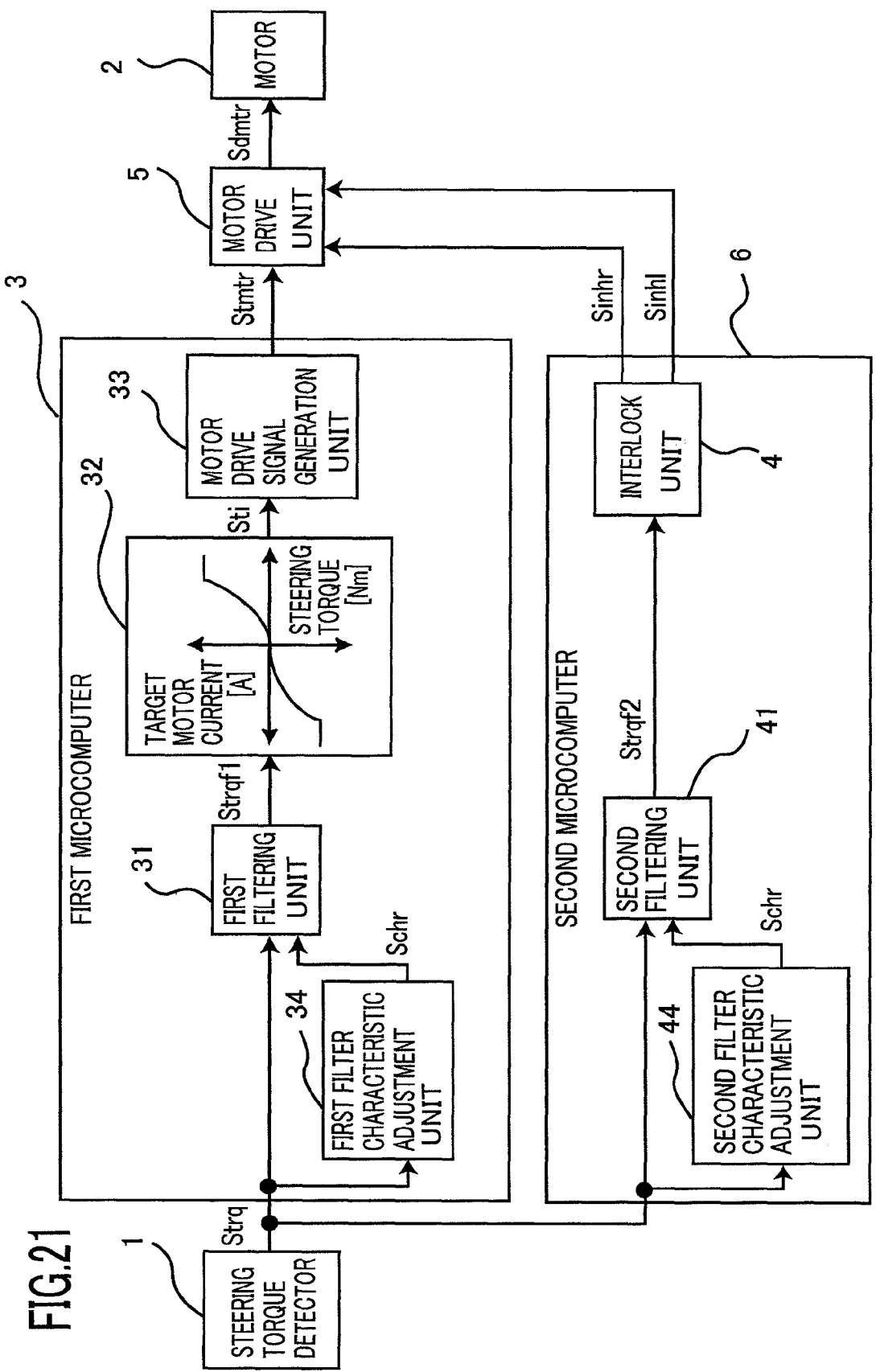
FIG. 21 is a block diagram illustrating the configuration of an electric power steering apparatus according to Embodiment 5 of the present invention.

FIG. 21 is a block diagram for an electric power steering apparatus according to Embodiment 5 of the present invention. In FIG. 21, the second microcomputer 6 includes a second filter characteristic adjustment unit 44 configured in the same manner as the first filter characteristic adjustment unit 34 included in the first microcomputer 3. Other configurations are the same as those in Embodiment 4.

In the electric power steering apparatus according to Embodiment 5 of the present invention, an optimal filter characteristic can be selected in accordance with a vehicle driving condition recognized through the steering torque signal, the vehicle speed signal, the steering speed signal, or the like; and the respective filter characteristics of the second filtering unit 41 and the first filtering unit 31 can be made to be the same as each other. Therefore, there can be realized an electric power steering apparatus capable of more securely ensuring the stability of a steering system and capable of more securely setting of desired steering feeling, compared with Embodiments 1 and 2. Moreover, the calculations in the first filter characteristic adjustment unit 34 and the second filter characteristic adjustment unit 44 are separately performed by the first microcomputer 3 and the second microcomputer 6, respectively; thus, an electric power steering apparatus whose calculation independence and reliability are enhanced can be realized.

Various modifications and alterations of this invention will be apparent to those skilled in the art without departing from the scope and spirit of this invention, and it should be understood that this is not limited to the illustrative embodiments set forth herein.

What is claimed is:

1. An electric power steering apparatus that, by use of driving force of a motor, reduces steering torque, on a steering system, that is exerted by a driver of a vehicle via a steering wheel, the electric power steering apparatus comprising:
    a steering torque detector that detects the steering torque and outputs a steering torque signal corresponding to the steering torque;
    a first filtering unit that applies filtering processing to the steering torque signal outputted from the steering torque detector and outputs the steering torque signal obtained through the filtering processing;
    a control unit that receives the steering torque signal outputted from the first filtering unit and outputs a motor drive signal based on the inputted steering torque signal;
    a second filtering unit that applies filtering processing to the steering torque signal outputted from the steering torque detector and outputs the steering torque signal obtained through the filtering processing;
    an interlock unit that receives the steering torque signal outputted from the second filtering unit and outputs a motor drive inhibition signal, configured to limit drive of the motor, based on the inputted steering torque signal; and
    a motor drive unit that drives the motor, based on the motor drive signal outputted from the control unit and the motor drive inhibition signal outputted from the interlock unit,
    wherein the second filtering unit is configured to reduce the difference between the steering torque signal that is inputted from the first filtering unit to the control unit and the steering torque signal that is inputted from the second filtering unit to the interlock unit.

2. The electric power steering apparatus according to claim 1, further comprising a first filter characteristic adjustment unit that dynamically changes the filter characteristic of the first filtering unit, based on a condition of the vehicle or the driver.

3. The electric power steering apparatus according to claim 2, wherein the first filter characteristic adjustment unit changes the filter characteristic of the second filtering unit as well as the filter characteristic of the first filtering unit.

4. The electric power steering apparatus according to claim 2, further comprising a second filter characteristic adjustment unit that dynamically changes the filter characteristic of the second filtering unit, based on a condition of the vehicle or the driver.

5. The electric power steering apparatus according to claim 1, wherein the first filtering unit is included in a first microcomputer mounted on the vehicle, and the second filtering unit is formed of an analogue circuit.

6. The electric power steering apparatus according to claim 1, wherein the first filtering unit is included in a first microcomputer mounted on the vehicle, and the second filtering unit is included in a second microcomputer mounted on the vehicle.

* * * * *